(12) United States Patent
Xu

(10) Patent No.: US 11,604,726 B2
(45) Date of Patent: Mar. 14, 2023

(54) MEMORY MANAGEMENT METHOD, ELECTRONIC DEVICE AND STORAGE MEDIUM

(71) Applicant: HANGZHOU HIKVISION DIGITAL TECHNOLOGY CO., LTD., Zhejiang (CN)

(72) Inventor: Feng Xu, Zhejiang (CN)

(73) Assignee: HANGZHOU HIKVISION DIGITAL TECHNOLOGY CO., LTD, Zhejiang (CN)

( * ) Notice: Subject to any disclaimer, the term of this patent is extended or adjusted under 35 U.S.C. 154(b) by 440 days.

(21) Appl. No.: 16/631,304

(22) PCT Filed: May 25, 2018

(86) PCT No.: PCT/CN2018/088395
§ 371 (c)(1),
(2) Date: Jan. 15, 2020

(87) PCT Pub. No.: WO2019/015395
PCT Pub. Date: Jan. 24, 2019

(65) Prior Publication Data
US 2020/0210329 A1 Jul. 2, 2020

(30) Foreign Application Priority Data
Jul. 18, 2017 (CN) .......................... 201710587746.0

(51) Int. Cl.
*H04N 21/433* (2011.01)
*G06F 12/02* (2006.01)
(Continued)

(52) U.S. Cl.
CPC ........ *G06F 12/023* (2013.01); *G06F 12/0646* (2013.01); *G06T 1/60* (2013.01);
(Continued)

(58) Field of Classification Search
CPC ....................................................... G06T 1/60
(Continued)

(56) References Cited

U.S. PATENT DOCUMENTS

2004/0205319 A1  10/2004  Pickreign et al.
2009/0257508 A1  10/2009  Aggarwal et al.
(Continued)

FOREIGN PATENT DOCUMENTS

CN   101320351 A   12/2008
CN   101984417 A    3/2011
(Continued)

OTHER PUBLICATIONS

International Search Report; PCT/CN2018/088395; dated Aug. 21, 2018; 4 pages.
(Continued)

*Primary Examiner* — Joel W Fosselman
(74) *Attorney, Agent, or Firm* — Knobbe, Martens, Olson & Bear, LLP

(57) ABSTRACT

The present disclosure provides a memory management method, and belongs to the technical field of networks. The method includes: allocating a first memory address to video frame data based on a memory multiplexing queue, wherein the memory multiplexing queue records a memory address of video frame data that has been rendered; storing the video frame data in a memory space indicated by the first memory address; and adding the first memory address to the memory multiplexing queue after performing rendering based on the video frame data.

17 Claims, 10 Drawing Sheets

(51) Int. Cl.
   *G06F 12/06*      (2006.01)
   *H04N 21/4335*    (2011.01)
   *G06T 1/60*       (2006.01)
   *H04N 19/423*     (2014.01)

(52) U.S. Cl.
   CPC ... *H04N 21/4335* (2013.01); *G06F 2212/251* (2013.01); *H04N 19/423* (2014.11); *H04N 21/433* (2013.01)

(58) Field of Classification Search
   USPC .................................................. 348/231.99
   See application file for complete search history.

(56) References Cited

U.S. PATENT DOCUMENTS

| | | |
|---|---|---|
| 2013/0044260 A1 | 2/2013 | Vestergaard et al. |
| 2013/0067186 A1 | 3/2013 | Pronovost et al. |

FOREIGN PATENT DOCUMENTS

| | | |
|---|---|---|
| CN | 103246567 A | 8/2013 |
| CN | 105245912 A | 1/2016 |

OTHER PUBLICATIONS

Office Action of corresponding Chinese Patent Application No. 201710587746.0—19 pages (dated Apr. 8, 2020).
Extended European Search Report of corresponding EP Patent Application No. 18834482.4—9 pages (dated Jun. 16, 2020).

MEMORY MANAGEMENT METHOD, ELECTRONIC DEVICE AND STORAGE MEDIUM

CROSS-REFERENCE TO RELATED APPLICATION

This disclosure is a National Phase of the International Application No. PCT/CN2018/088395, filed on May 25, 2018, which claims priority to Chinese Patent Application No. 201710587746.0, filed on Jul. 18, 2017 and entitled "MEMORY MANAGEMENT METHOD AND APPARATUS", which is hereby incorporated by reference in its entirety.

TECHNICAL FIELD

The present disclosure relates to the field of network technologies, and in particular, relates to a memory management method, an electronic device, and a storage medium.

BACKGROUND

A terminal may perform video playback on a webpage by a browser. During video playback, the terminal needs to manage the memory occupied by the browser, for example, decoding a video stream and allocating memory to the browser, and reclaiming the allocated memory.

SUMMARY

Embodiments of the present disclosure provide a memory management method, an electronic device, and a storage medium. The technical solutions are as follows:

In a first aspect, a memory management method is provided. The method includes:

allocating a first memory address to video frame data based on a memory multiplexing queue, wherein the memory multiplexing queue records a memory address of video frame data that has been rendered;

storing the video frame data in a memory space indicated by the first memory address; and adding the first memory address to the memory multiplexing queue after performing rendering based on the video frame data.

In a possible implementation, the allocating a first memory address to video frame data based on a memory multiplexing queue includes:

acquiring a second memory address from the memory multiplexing queue according to a data volume of the video frame data when the memory multiplexing queue includes a memory address, wherein a memory space indicated by the second memory address is not less than the data volume of the video frame data; and removing the second memory address from the memory multiplexing queue when the second memory address is acquired from the memory multiplexing queue, and taking the second memory address as the first memory address.

when In a second aspect, an electronic device is provided. The electronic device includes a processor and a memory, wherein the memory is configured to store a computer program; and the processor is configured to execute the computer program stored in the memory to perform the following steps:

allocating a first memory address to video frame data based on a memory multiplexing queue, wherein the memory multiplexing queue records a memory address of video frame data that has been rendered;

storing the video frame data in a memory space indicated by the first memory address; and adding the first memory address to the memory multiplexing queue after performing rendering based on the video frame data.

In a third aspect, a computer-readable storage medium storing a computer program is provided. The computer program is executed by a processor to perform the following operations:

allocating a first memory address to video frame data based on a memory multiplexing queue, wherein the memory multiplexing queue records a memory address of video frame data that has been rendered;

storing the video frame data n a memory space indicated by the first memory address; and adding the first memory address to the memory multiplexing queue after performing rendering based on the video frame data.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

The present disclosure is described in further detail hereinafter with reference to the accompanying drawings, to present the objects, technical solutions, and advantages of the present disclosure more clearly.

In the related art, after receiving a video stream from a server, the browser generally decodes the video stream in units of frames. For each frame of video data obtained by decoding, the terminal needs to allocate a specific size of memory space to store each frame of video data after decoding, so as to render each frame of video data after decoding subsequently to present a video picture at the terminal. The allocation of a specific size of memory space refers to the allocation of a memory address. The terminal periodically reclaims the memory address that has been allocated.

During the process of implementing the present disclosure, the inventors found that the related art has at least the following problems:

For video data with a higher frame rate, such as video data with a frame rate of 25 fps (frames per second), 25 memory allocations are required in one second, and 1500 times in one minute, resulting in allocating a large number of memory addresses to the browser within a short time. Even if the allocated memory addresses are periodically reclaimed, such a large number of memory addresses may not be reclaimed in time, resulting in large memory usage and low memory utilization.

Figure 1:
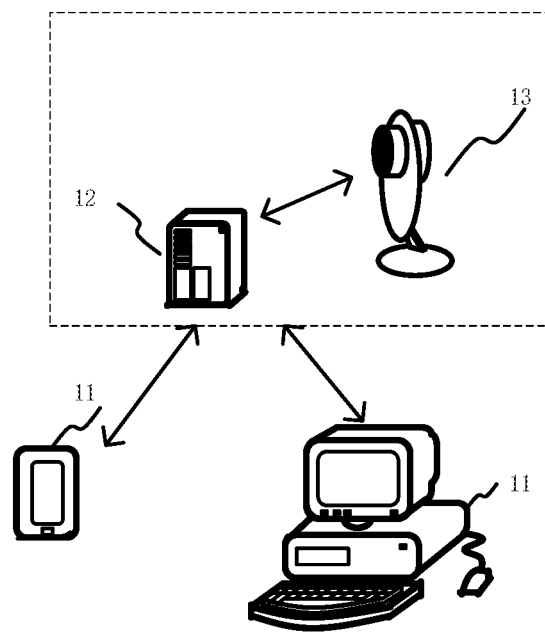
FIG. 1 is a schematic diagram of an implementation environment according to an embodiment of the present disclosure.

FIG. 1 is a schematic diagram of an implementation environment according to an embodiment of the present disclosure. The environment involves a terminal 11, a server 12, and a monitoring device 13.

The terminal 11 is capable of playing a video in a webpage. The server 12 is configured to provide a multimedia service to the terminal 11, such as providing a video stream. The monitoring device 13 has a video acquisition function.

In an implementation, the multimedia service function of the server 12 is integrated in the monitoring device 13. After integrating the function of the server 12, the monitoring device 12 may also provide a multimedia service for the terminal 11. The terminal 11 may directly interact with the monitoring device 13 via the Internet. For example, a browser is installed on the terminal 11. The monitoring device 13 is accessed by inputting a network address of the monitoring device 13 in the browser to acquire a video stream collected by the monitoring device 13 in real time.

Specifically, the monitoring device 13 may be further provided with a memory (such as a hard disk storage). The monitoring device 13 may store the collected video data in the memory, such that the terminal 11 may acquire the already stored video data, thereby performing playback of the monitoring video.

In another implementation, the server 12 acts as a separate entity. The terminal 11 and the monitoring device 13 may interact with the server 12 via the Internet respectively. The monitoring device 13 may send the collected monitoring video stream to the server 12 in real time. The server 12 forwards the video stream to the terminal 13 as a relay to perform real-time monitoring by the terminal. For example, a browser is installed on the terminal 11. A video stream forwarded in real time or other multimedia data, such as image data and audio and video data, is acquired from the server 12 by inputting an access address of the server 12 in the browser.

The server 12 may also store the monitoring video stream received from the monitoring device 13, for example, in the hard disk storage, such that the terminal 11 may also acquire the stored monitoring video data from the server 12 for monitoring playback.

It should be noted that when the multimedia service function of the server 12 is integrated in the monitoring device 13, the steps to be performed by the server 12 may refer to the steps performed by the monitoring device 13.

Figure 2:
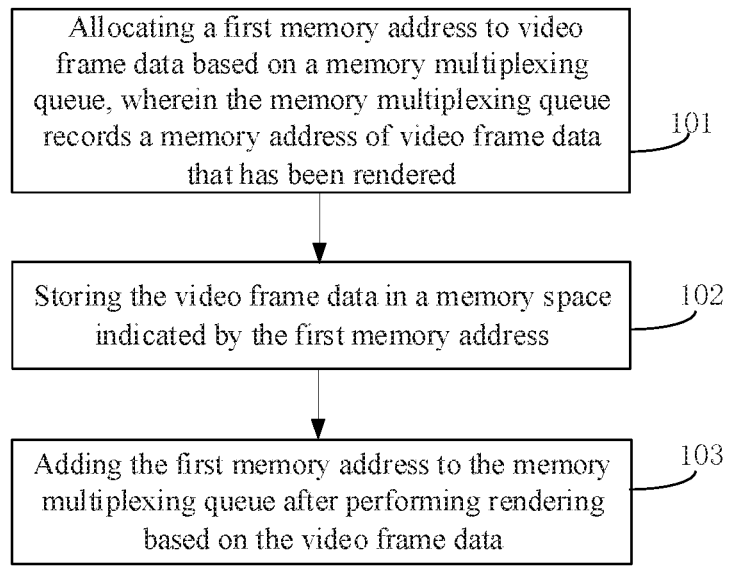
FIG. 2 is a flowchart of a memory management method according to an embodiment of the present disclosure.

FIG. 2 is a flowchart of a memory management method according to an embodiment of the present disclosure. The method may solve the problems of large memory usage and low memory utilization. Referring to FIG. 2, the method process according to an embodiment of the present disclosure includes the following steps.

In step 101, a first memory address is allocated to video frame data based on a memory multiplexing queue. The memory multiplexing queue records a memory address of video frame data that has been rendered.

In step 102, the video frame data is stored in a memory space indicated by the first memory address.

In step 103, the first memory address is added to the memory multiplexing queue after rendering is performed based on the video frame data.

In a possible implementation, the allocating a first memory address to video frame data based on a memory multiplexing queue includes:

acquiring a second memory address from the memory multiplexing queue according to a data volume of the video frame data when the memory multiplexing queue includes a memory address, wherein a memory space indicated by the second memory address is not less than the data volume of the video frame data; and removing the second memory address from the memory multiplexing queue when the second memory address is acquired from the memory multiplexing queue, wherein the second memory address is taken as the first memory address.

In a possible implementation, after the acquiring a second memory address from the memory multiplexing queue according to a data volume of the video frame data, the method further includes:

acquiring a third memory address from memory addresses other than the memory multiplexing queue when the second memory address is not acquired from the memory multiplexing queue, wherein a memory space indicated by the third memory address is not less than the data volume of the video frame data; and taking the third memory address as the first memory address.

In a possible implementation, the allocating a first memory address to video frame data based on a memory multiplexing queue includes:

acquiring a fourth memory address from memory addresses other than the memory multiplexing queue when the memory multiplexing queue does not include any memory address; and taking the fourth memory address as the first memory address.

In a possible implementation, the method further includes:

acquiring a resolution of a video stream upon receiving the video stream; and performing the step of allocating a first memory address to video frame data based on a memory multiplexing queue according to a data volume of video frame data indicated by the resolution.

In a possible implementation, the method further includes:

performing the step of allocating a first memory address to video frame data based on a memory multiplexing queue when the video frame data is acquired during a process of decoding the received video stream.

In a possible implementation, the method further includes:

launching a child thread by a specified interface of a multimedia browsing application; and decoding the video frame data by the child thread.

In a possible implementation, the method further includes:

rendering the video frame data by a main thread of a multimedia browsing application;

wherein correspondingly, the adding the first memory address to the memory multiplexing queue after performing rendering based on the video frame data includes:

passing the first memory address to a child thread of the multimedia browsing application by the main thread, and adding the first memory address to the memory multiplexing queue by the child thread.

In a possible implementation, the method further includes:

rendering the video frame data by a main thread of a multimedia browsing application;

wherein correspondingly, the adding the first memory address to the memory multiplexing queue after performing rendering based on the video frame data includes:

adding the first memory address to the memory multiplexing queue by the main thread.

In the method according to the embodiment of the present disclosure, by adding a memory address of video frame data that has been rendered to a memory multiplexing queue, memory allocation may be performed according to the memory multiplexing queue, such that the allocated memory address may be reused. During video playback, there is no need to open up a memory space for each piece of video frame data, which reduces the memory occupation rate and improves the memory utilization rate.

In the embodiment of the present disclosure, the terminal is installed with a multimedia browsing application. The multimedia browsing application refers to an application that displays multimedia data in a webpage. For example, the multimedia browsing application may be a browser. The browser may be a non-plug-in browser. That is, videos may be played on webpages without installing any video plug-ins. For example, when the terminal accesses the monitoring device by the browser, the terminal may acquire a video decoding program by the monitoring device, and decode a received video stream by executing the video decoding program, so as to play the video in the webpage. Nevertheless, the browser may also perform video decoding by installing a video plug-in to provide the function of playing a video in a webpage. After acquiring the video stream from the server by the browser, the terminal decodes each frame of data indicated by the video stream. In the embodiment of the present disclosure, each frame of decoded video data is referred to as video frame data. The terminal needs to allocate memory for the video frame data, that is, allocate a memory address to the video frame data to store the video frame data in a memory space indicated by the memory address.

Figure 3:
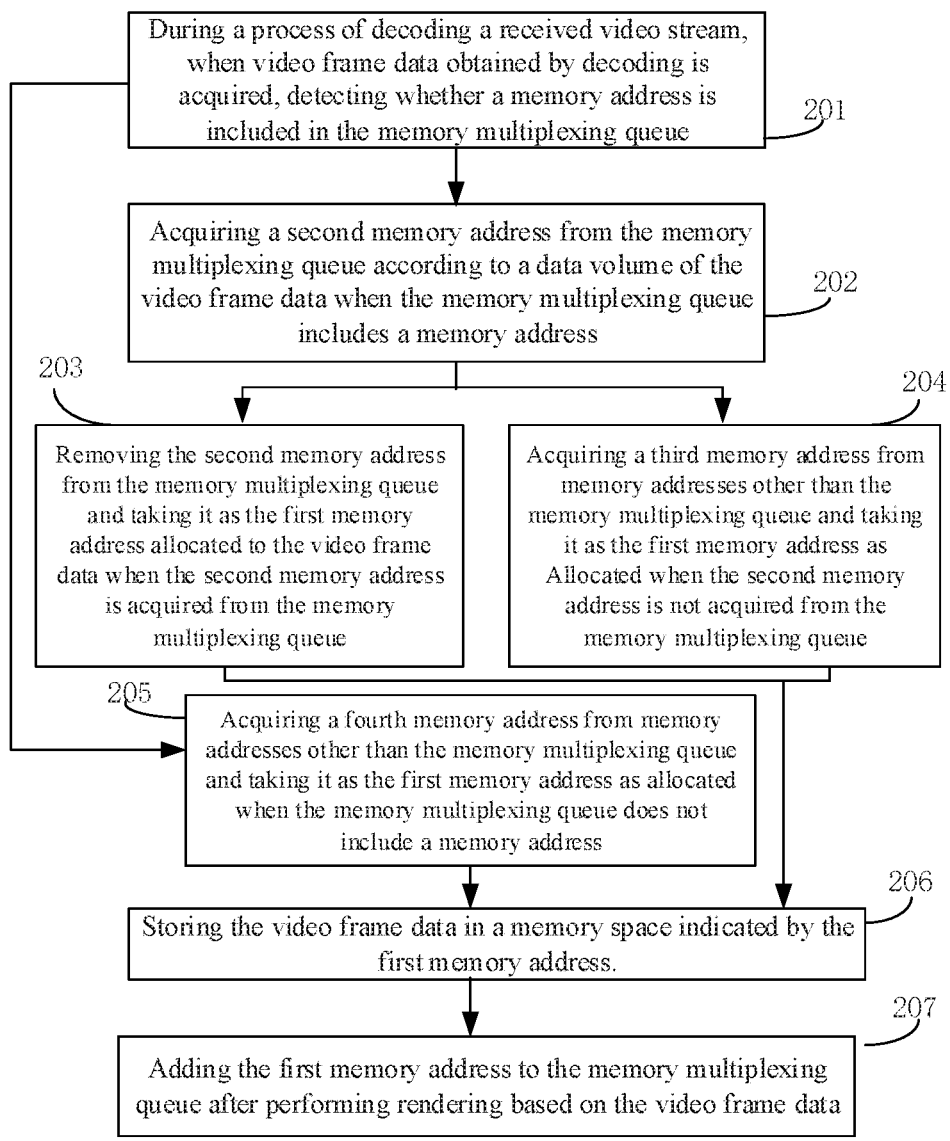
FIG. 3 is a flowchart of a memory management method according to an embodiment of the present disclosure.

It should be noted that the process that the terminal allocates memory to video frame data is a process in which the multimedia browsing application applies for memory of the video frame data. The following embodiment is exemplified by the terminal performing memory allocation, in which the executing entity may replace the terminal with the multimedia browsing application. The following is an example in which the multimedia browsing application is a browser. In the embodiment of the present disclosure, the fashion in which the terminal allocates memory may include the following two types according to different memory allocation timings:

(1) After receiving a video stream by the browser, the terminal first decodes the video stream, and then performs memory allocation according to the video frame data obtained by decoding. The allocated memory address may be a memory address removed from the memory multiplexing queue. After the video frame data is rendered, the allocated memory address may be added to the memory multiplexing queue to implement multiplexing of the allocated memory address. This process is detailed in the embodiment as illustrated in FIG. 3. The memory multiplexing queue records the memory address of the video data that has been rendered.

Figure 7:
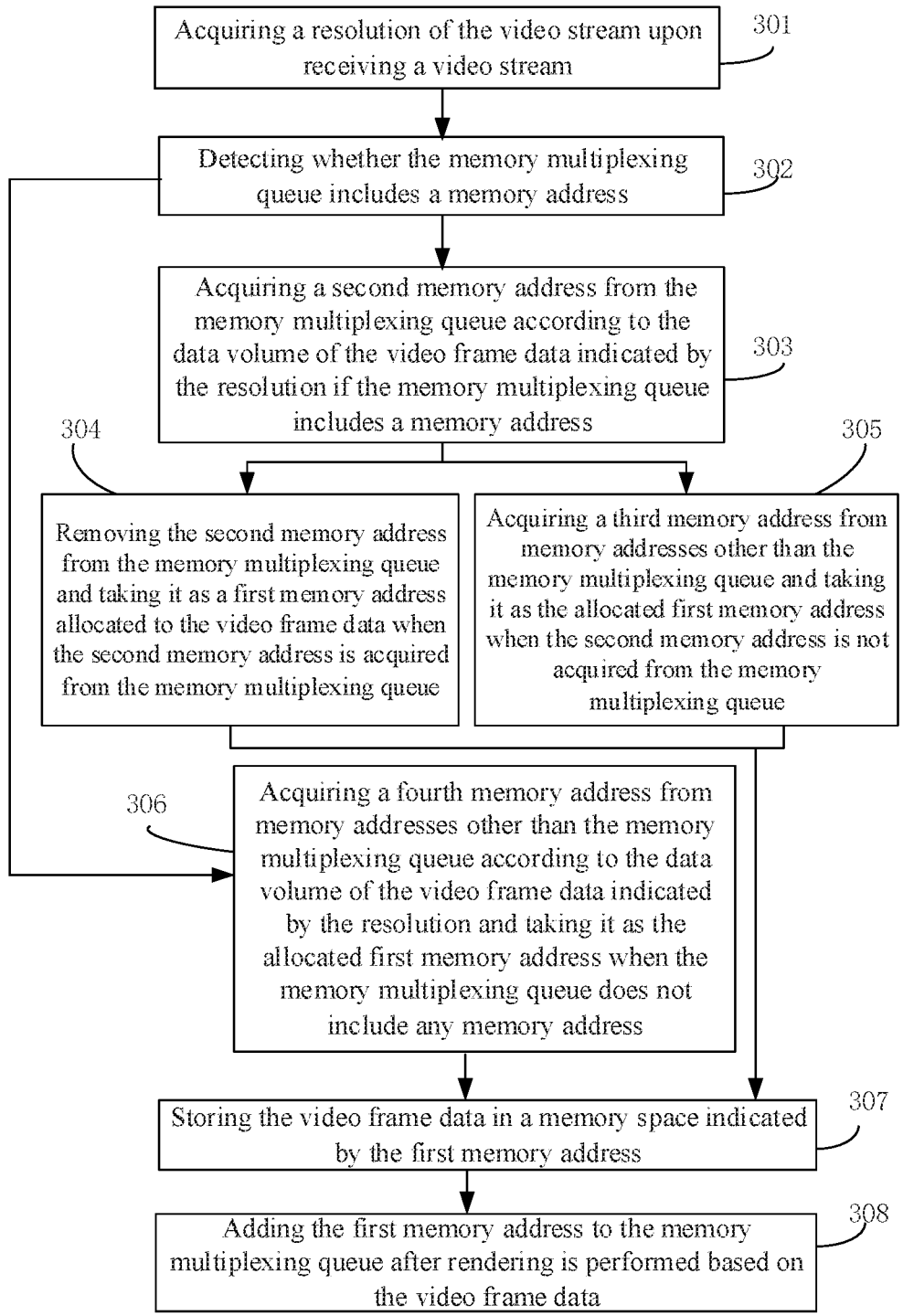
FIG. 7 is a flowchart of a memory management method according to an embodiment of the present disclosure.

(2) After receiving a video stream by the browser, the terminal allocates memory in advance. The pre-allocated memory address may be a memory address removed from the memory multiplexing queue. After video frame data is obtained by decoding, the video frame data is stored in a memory space indicated by the pre-allocated memory address. After the video frame data is rendered, the allocated memory address may also be added to the memory multiplexing queue to implement multiplexing of the allocated memory address. This process is detailed in the embodiment as illustrated in FIG. 7.

It should be noted that, for convenience of description, the following embodiment introduces the memory management process of the terminal by taking one frame of video frame data obtained by decoding as an example. The memory address allocated to the video frame data is simply referred to as a first memory address.

FIG. 3 is a flowchart of a memory management method according to an embodiment of the present disclosure. Referring to FIG. 3, the method process according to the embodiment of the present disclosure includes the following steps.

In step 201, during a process of decoding a received video stream, when video frame data obtained by decoding is acquired, whether a memory address is included the memory multiplexing queue is detected, and when the memory address is included, step 202 is performed, and otherwise, step 205 is performed.

In the embodiment of the present disclosure, after acquiring a video stream from a server, a terminal decodes each frame of video data indicated by the video stream. The video stream includes a plurality of data packets conforming to a preset format. Each data packet corresponds to a frame identifier. Data packets having the same frame identifier constitute one frame of video data. The terminal may determine one frame of video data according to the frame identifier of the data packet, and after the one frame of video data is all received, decode the one frame of video data to acquire video frame data. The preset format may be set or modified in advance according to the actual video transmission requirement, which is not limited in the embodiment of the present disclosure.

Figure 4:
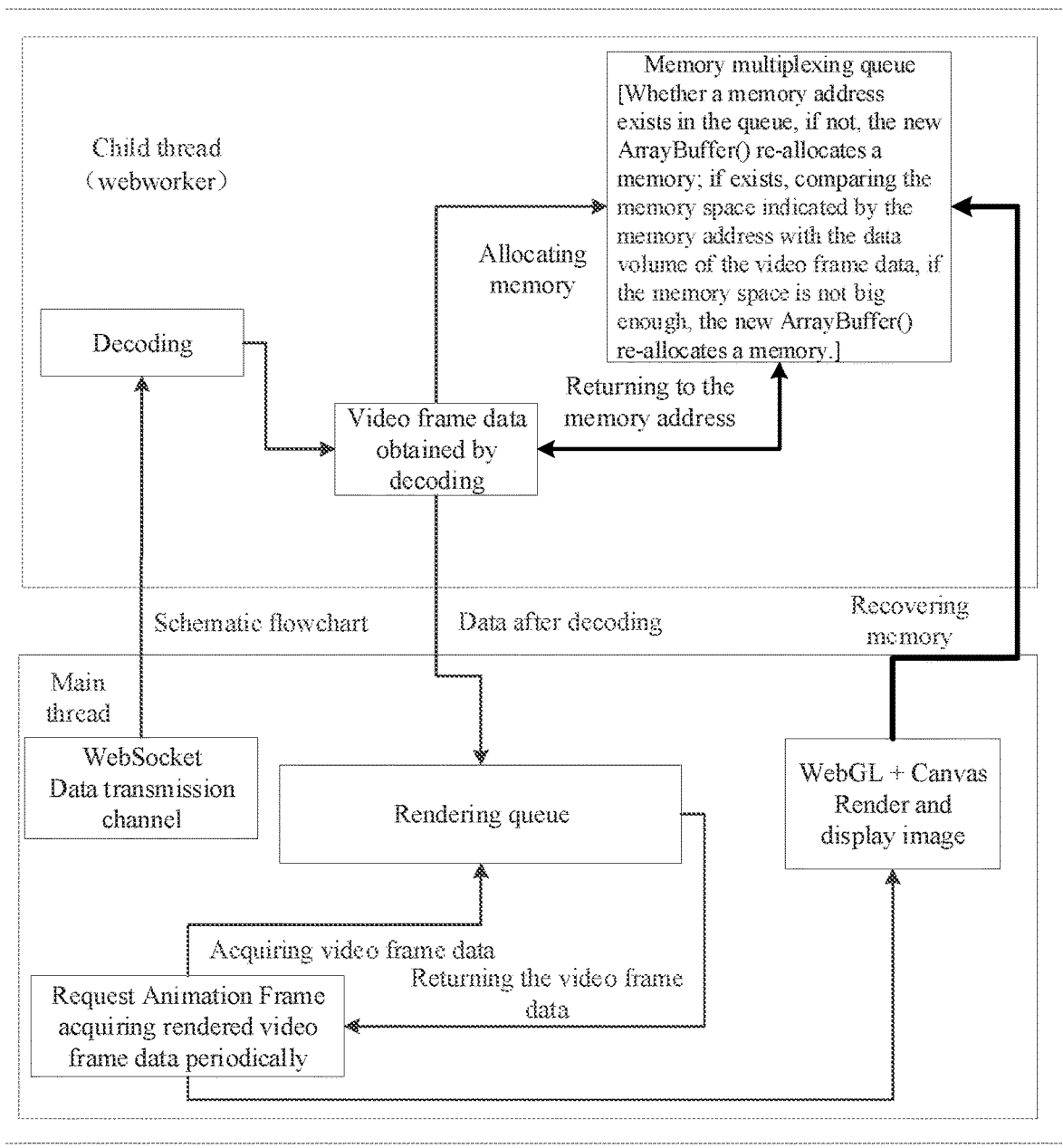
FIG. 4 is a schematic flowchart of memory management according to an embodiment of the present disclosure.

The terminal may receive the video stream from the server in a main thread. Since the video decoding process is time-consuming, in order not to block the main thread, the web worker technology may be used to create an asynchronous thread different from the main thread to perform the decoding process. The asynchronous thread may also be called a child thread. In implementation, the terminal may start a child thread by a specified interface of the browser, and decode the video frame data by the child thread. The specified interface may be set or modified in advance. For example, the specified interface may be a web worker interface of the browser, which is not limited in the embodiment of the present disclosure. Referring to FIG. 4, a schematic flowchart of memory management is illustrated. The terminal invokes a WebSocket interface by the main thread and creates a data transmission channel, and acquires a video stream (the real-time stream in FIG. 4) from a monitoring device or a server over the data transmission channel. After acquiring the video stream, the main thread sends the video stream to the child thread. For example, the terminal sends the video stream to the child thread by calling a thread interaction interface (postMessage).

The memory multiplexing queue records a memory address of video data that has been rendered. It should be noted that after video frame data is obtained by decoding, the terminal needs to render the video frame data to display a video picture corresponding to the video frame data, thereby implementing video playback. In the embodiment of the present disclosure, a memory address occupied by video frame data that has been rendered is added to the memory multiplexing queue, such that a memory space indicated by the memory address is subsequently reused.

In the embodiment of the present disclosure, the memory multiplexing queue may be initially empty; or one or more memory addresses capable of satisfying the data volume of the video frame data may be preset in the memory multiplexing queue, that is, memory addresses corresponding to the resolution of the video stream.

It should be noted that the memory address in the embodiment of the present disclosure refers to a memory address corresponding to a memory block. For example, when memory is addressed in units of bytes, assuming that a memory block includes 16 bytes, then a memory address corresponding to the memory block is the 16-byte address. During implementation, the logic layer may represent an allocated memory block by an array. Accordingly, the memory multiplexing queue is an array queue, and each array may be called an element of the queue.

In the embodiment of the present disclosure, the terminal may detect whether the memory multiplexing queue is empty (whether a memory address exists or is included), and when the memory address exists or is included, it is determined that the memory multiplexing queue includes a memory address, and step 202 is performed; and when the memory address does not exists or is not included, it is determined that the memory multiplexing queue does not include any memory address, and step 205 is performed. The process that the terminal detects whether the memory multiplexing queue is empty may include: acquiring a first element from a queue header of the memory multiplexing queue, and when the first element is not empty, determining that the memory multiplexing queue is not empty; and when the first element is empty, determining that the memory multiplexing queue is empty.

In step 202, when the memory multiplexing queue includes a memory address, a second memory address is acquired from the memory multiplexing queue according to a data volume of the video frame data.

After obtaining the video data by decoding, the terminal may determine the data volume of the video frame data. For example, the terminal may determine a frame length and a frame width of the video frame data, and an image format of the video frame data to determine the data volume of the video frame data. The frame length of the video frame data refers to the number of pixels included in each row of an image indicated by the video frame data. The frame width of the video frame data refers to the number of pixels included in each column of the image indicated by the video frame data. The image format of the video frame data may be an RGB image format or a YUV image format, which is not limited in the embodiment of the present disclosure. It should be noted that, by default, the image format of the video frame data may be set to the YUV image format.

When the RGB image format is required for rendering, the terminal may perform image format conversion to convert the video frame data from the YUV image format to the RGB image format. In addition, the terminal may also perform image format processing in the decoding process to directly output video frame data in an image format that satisfies the rendering requirement.

It should be noted that the frame length and the frame width of the video frame data may be carried in the video frame data. The image format may be a default image format of the server and the terminal, and configured by the server to the terminal in advance. Nevertheless, the image format may also be notified to the terminal by being carried in the video frame data according to the actual needs, which is not limited in the embodiment of the present disclosure. After decoding the video stream to obtain the video frame data, the terminal may acquire the frame length, the frame width, and the image format from the video frame data, thereby determining the data volume of the video frame data. For example, for video frame data in an image format of RGB24, the data volume of the video frame data is width×height×3 bit. For video frame data in an image format of YUV420, the data volume of the video frame data is width×height×1.5 bit. Width represents the frame length of the video frame data, and height represents the frame width of the video frame data.

When the memory multiplexing queue includes a memory address, the terminal may compare a memory space indicated by the memory address with the video frame data according to the data volume of the video frame data, and acquire a second memory address from the memory multiplexing queue. A memory space indicated by the second memory address should be no less than the data volume of the video frame data.

The process that the terminal acquires a second memory address from the memory multiplexing queue according to the data volume of the video frame data may be as follows: The terminal acquires a memory address from the memory multiplexing queue according to the order of the memory addresses in the memory multiplexing queue, and detects whether a memory space indicated by the memory address is not less than the data volume of the video frame data; and when the memory space is not less than the data volume, the terminal determines the memory address as the second memory address; and otherwise, the terminal acquires a next memory address from the memory multiplexing queue until the second memory address is acquired.

In another implementation, since the resolution of the video stream is relatively stable for a period of time, the memory space indicated by a plurality of memory addresses included in the memory multiplexing queue should be the same. When the size of a memory space indicated by a first memory address in the memory multiplexing queue is smaller than the data volume of the video frame data, then the memory space indicated by a plurality of memory addresses acquired subsequently is likely to be smaller than the data volume of the video frame data. Therefore, in order to improve the processing efficiency, when the memory space indicated by the first memory address acquired by the terminal from the memory multiplexing queue is smaller than the data volume of the video frame data, the memory address is moved out of the memory multiplexing queue. The terminal no longer acquires a next memory address from the memory multiplexing queue and directly perform the process of acquiring a third memory address from memory addresses other than the memory multiplexing queue, which may be referred to step 204 for details.

When the terminal detects that a memory space indicated by the currently acquired memory address is smaller than the data volume of the video frame data, the terminal reclaims the memory address, that is, removing the memory address from the memory multiplexing queue, clearing data stored in the memory space indicated by the memory address and releasing the memory address. Since the resolution of the video stream is stable within a specific period of time, the memory space indicated by the memory address being smaller than the data volume of the video frame data indicates that the memory address may not be used within a specific period of time. The unused memory addresses being recovered in a timely fashion may reduce memory usage and increase memory utilization.

In step 203, when the second memory address is acquired from the memory multiplexing queue, the second memory address is removed from the memory multiplexing queue and taken as the first memory address allocated to the video frame data.

It should be noted that after step 203 is performed, step 206 is directly performed.

When acquiring the second memory address, the terminal removes the second memory address from the memory multiplexing queue and takes the same as the first memory address allocated to the video frame data to store the video frame data. Removing a memory address from the memory multiplexing queue means deleting the memory address from the memory multiplexing queue.

In step 204, when the second memory address is not acquired from the memory multiplexing queue, a third memory address is acquired from memory addresses other than the memory multiplexing queue and taken as the allocated first memory address.

The terminal may also acquire the second memory address from the memory multiplexing queue. For example, the memory space indicated by the memory address in the memory multiplexing queue is not large enough. That is, there is no memory address whose memory space is not less than the data volume of the video frame data in the memory multiplexing queue. At this time, the terminal may re-allocate a memory address to the video frame data. That is, the terminal acquires a third memory address from unallocated memory addresses other than the memory multiplexing queue and takes the same as the first memory address allocated to the video frame data. For example, the terminal may use a new ArrayBuffer( ) statement to create an array that satisfies the size of the video frame data. A memory address indicated by the array is the third memory address. Nevertheless, a memory space indicated by the third memory address is not less than the data volume of the video frame data.

It should be noted that after step 204 is performed, step 206 is directly performed.

In step 205, when the memory multiplexing queue does not include any memory address, a fourth memory address is acquired from memory addresses other than the memory multiplexing queue and taken as the allocated first memory address.

When detecting that the memory multiplexing queue does not include any memory address, the terminal re-allocates a memory address to the video frame data, that is, acquiring a fourth memory address from unallocated addresses other than the multiplexing queue. The process of allocating the fourth memory address is the same as the process of allocating the third memory address in step 203, and thus details are not given herein.

In step 206, the video frame data is stored in a memory space indicated by the first memory address.

Referring to FIG. 4, in the embodiment of the present disclosure, the process of decoding a video stream, the process of allocating memory after decoding, and the process of storing video frame data obtained by decoding may all be processed in a child thread. After storing the video frame data in the allocated memory space, the terminal may render the video frame data in a main thread to display a video picture indicated by the video frame data.

The process that the terminal renders the video frame data may be as follows: The terminal maintains a rendering queue in the main thread, and after storing the video frame data, the terminal sends the first memory address of the video frame data to the main thread by an address push message to add the first memory address to the render queue in the main thread. The address push message carries the first memory address. In implementation, the terminal renders the video frame data by the main thread of the multimedia browsing application.

During rendering, the terminal periodically scans the rendering queue. As illustrated in FIG. 4, the terminal requests video frame data (requestAnimationFrame) to the rendering queue, sequentially acquires the video frame data indicated by the memory address according to the order of the memory addresses in the rendering queue, and renders the acquired video frame data. Due to the difference between the decoding speed and the rendering speed of the video stream by the terminal, the rendering queue may be empty when the terminal reaches the scanning cycle of the rendering queue. At this time, the terminal does not perform the rendering process, and continues to scan until the next scanning cycle. When the rendering queue is not empty, the terminal performs rendering according to the video frame data indicated by the memory address in the rendering queue. For example, the terminal may perform rendering using a preset drawing standard and display the rendered image with a canvas as a container. The preset drawing standard may be a WebGL (Web Graphics Library) drawing standard, which is not limited in the embodiment of the present disclosure.

In step 207, after performing rendering based on the video frame data, the first memory address is added to the memory multiplexing queue.

In order to avoid the rapid increase of memory usage caused by the continuous allocation of new memory, in the embodiment of the present disclosure, the memory space occupied by the video frame data that has been rendered is reused. That is, the memory address of the video frame data that has been rendered is reclaimed into the memory multiplexing queue, such that the memory address is subsequently allocated again to other unrendered video frame data.

The terminal may add the first memory address to the memory multiplexing queue in two ways: in an implementation, the terminal may pass the first memory address to a child thread of the multimedia browsing application by a main thread, and adds the first memory address to the memory multiplexing queue by the child thread; in another implementation, the terminal directly adds the first memory address to the memory multiplexing queue by a main thread. During implementation, after rendering the video frame data in a main thread, the terminal may send the first memory address to a child thread by calling a thread interaction interface (postMessage), and perform the step of adding the first memory address to the memory multiplexing queue by the child thread.

It should be noted that, since the decoding speed and the rendering speed of the video stream are relatively stable for a period of time, the number of occupied memory addresses of the terminal may reach a stable state. That is, when the number of occupied memory addresses of the terminal reaches a specific number, the storage requirement of the video frame data that has been decoded but not yet rendered may be satisfied. At this time, the number of memory addresses included in the memory multiplexing queue is also relatively stable. That is, when a memory address is moved out of the memory multiplexing queue, a memory address is also added to the memory multiplexing queue. By the test of playing a high-definition monitoring video, during video playback, the playback requirements may be satisfied as long as the memory multiplexing queue includes five memory addresses. Because the terminal only needs to open up a small number of memory addresses during video playback, a video may be played in a webpage by reusing the small number of memory addresses, thereby greatly reducing memory usage and improving memory utilization.

Figure 5:
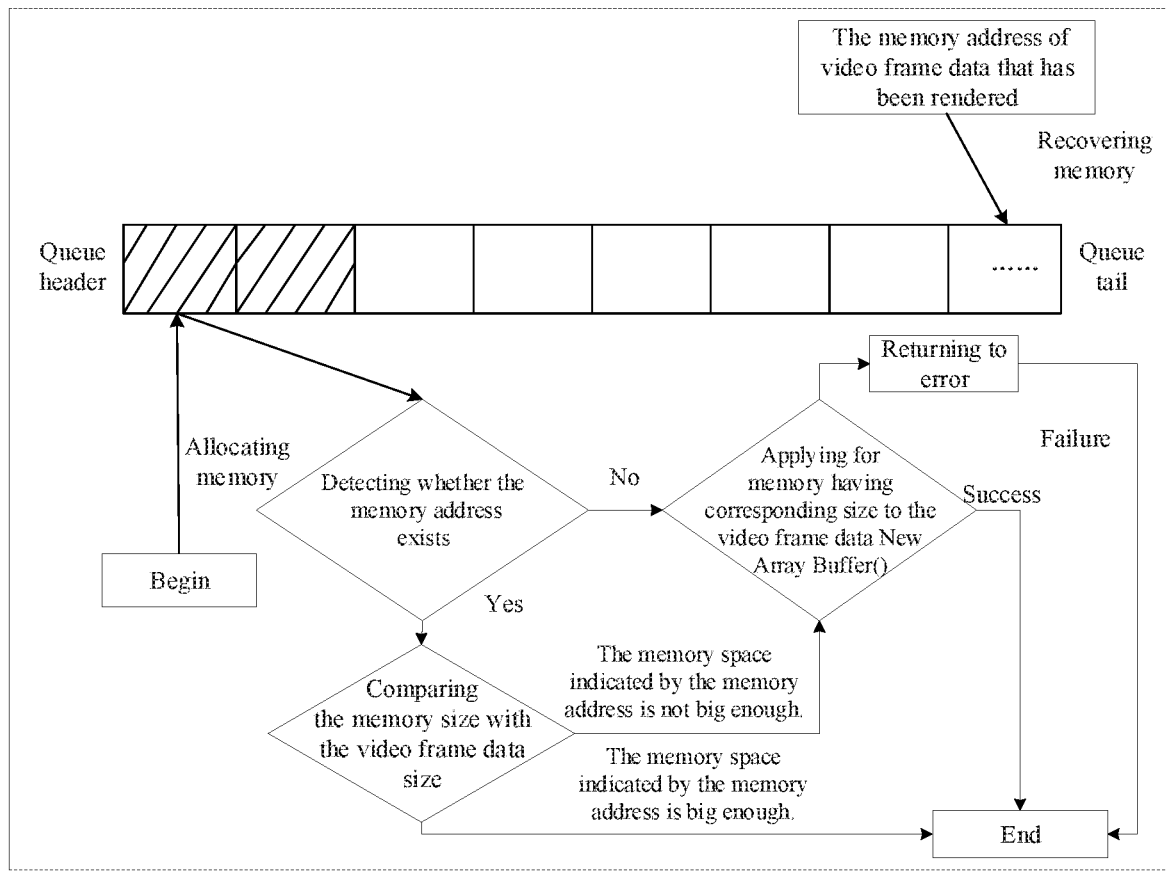
FIG. 5 is a schematic diagram of a memory multiplexing queue according to an embodiment of the present disclosure.

In order to explain the principle of the memory multiplexing queue more clearly, the following is a description of the memory multiplexing queue illustrated in FIG. 5. The memory multiplexing queue includes a queue header and a queue tail. The terminal moves a memory address from the queue header for memory allocation. This process may include the processes corresponding to the above steps 201 to 205. The terminal adds the memory address of the video frame data that has been rendered to the queue tail. This process may include the process corresponding to step 206 to step 207.

In the method according to the embodiment of the present disclosure, by adding a memory address of video frame data that has been rendered to a memory multiplexing queue, memory allocation may be performed according to the memory multiplexing queue, such that the allocated memory address may be reused. During video playback, there is no need to open up a memory space for each piece of video frame data, which reduces the memory occupation rate and improves the memory utilization rate.

In addition, in the embodiment of the present disclosure, memory is allocated to video frame data after the video frame data is obtained by decoding, such that the terminal may dynamically allocate an appropriate memory space for the video frame data according to the actual data volume of the video frame data, increasing flexibility in memory allocation.

Figure 6:
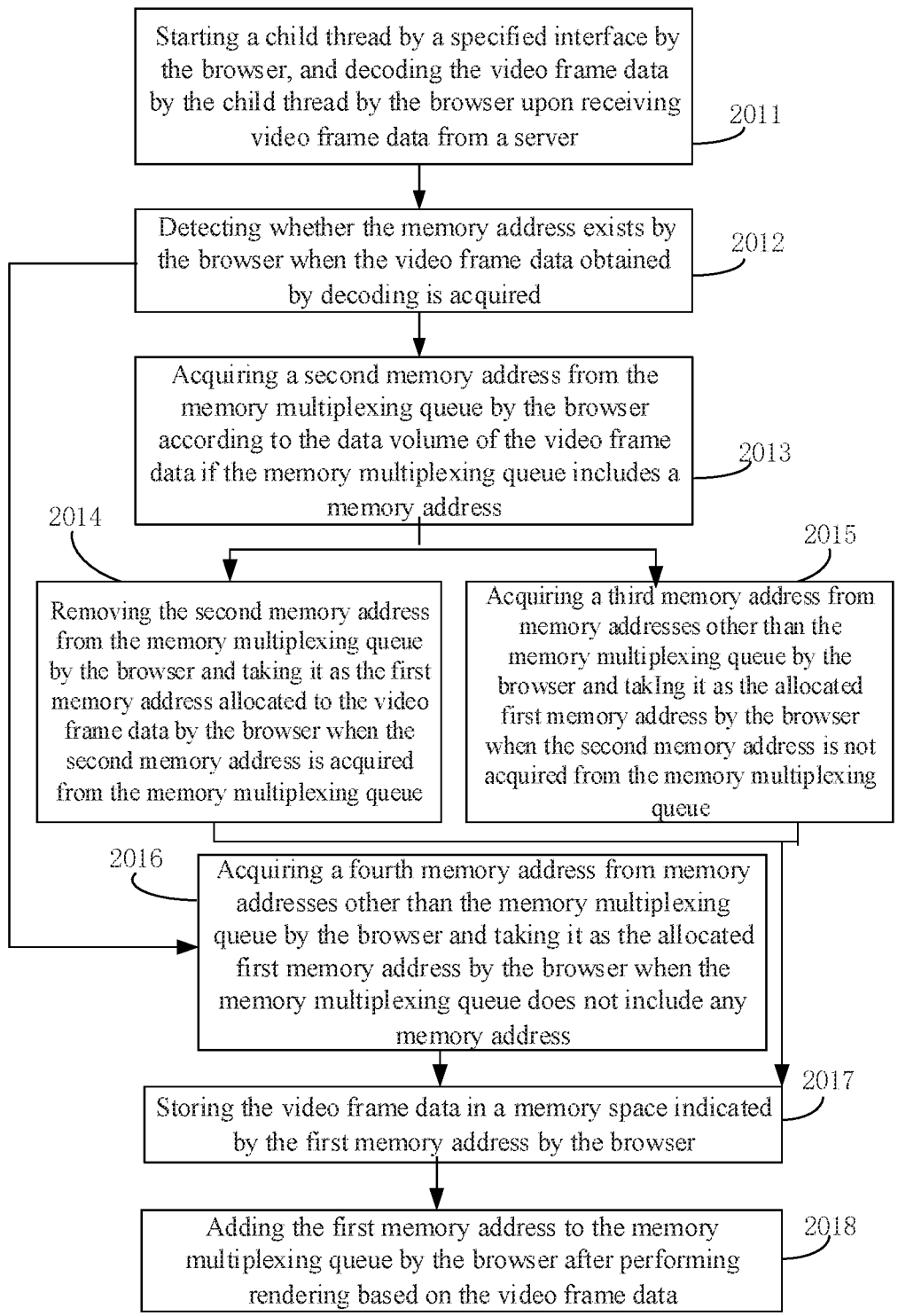
FIG. 6 is a flowchart of memory management method according to an embodiment of the present disclosure.

Since the main body of the memory management in the embodiment of the present disclosure is the multimedia browsing application, in order to explain the flow of the memory management method more clearly, the multimedia browsing application being a browser is taken as an example to introduce the memory management method as described in FIG. 3. Details may be referred to FIG. 6.

In step 2011, upon receiving video frame data from a server, the browser starts a child thread by a specified interface, and decodes the video frame data by the child thread.

In the embodiment of the present disclosure, the browser acquires a video stream from the server by using an input IP address. The video stream includes a plurality of pieces of video frame data. The browser decodes each received frame of data for subsequently displaying video content to a user by rendering.

The browser receives the video stream from the server in a main thread. Since the video decoding process is time-consuming, in order not to block the main thread, the web worker technology may be used to create an asynchronous thread different from the main thread to perform the decoding process. The asynchronous thread may also be called a child thread. In implementation, a child thread may be started by a specified interface of the browser to decode the video frame data. The specified interface may be set or modified in advance. For example, the specified interface may be a web worker interface of the browser, which is not limited in the embodiment of the present disclosure. Referring to FIG. 4, a schematic flowchart of memory management is illustrated.

The video stream includes a plurality of data packets conforming to a preset format. Each data packet corresponds to a frame identifier. Data packets having the same frame identifier constitute one frame of video data. The terminal may determine one frame of video data according to the frame identifier of the data packet, and after the one frame of video data is all received, decode the one frame of video data to acquire video frame data. The preset format may be set or modified in advance according to the actual video transmission requirement, which is not limited in the embodiment of the present disclosure.

In step 2012, when the video frame data obtained by decoding is acquired, the browser detects whether the memory multiplexing queue includes a memory address; and when the memory multiplexing queue includes a memory address, step 2013 is performed; and otherwise, step 2016 is performed.

The memory multiplexing queue records a memory address of video data that has been rendered. After video frame data is obtained by decoding, the browser needs to render the video frame data to display a video picture corresponding to the video frame data, thereby implementing video playback. In the embodiment of the present disclosure, the browser may add a memory address occupied by video frame data that has been rendered to the memory multiplexing queue, such that a memory space indicated by the memory address is subsequently reused.

In the embodiment of the present disclosure, the memory multiplexing queue may be initially empty; or one or more memory addresses capable of satisfying the data volume of the video frame data may be preset in the memory multiplexing queue, that is, the memory address corresponding to the resolution of the video stream.

It should be noted that the memory address in the embodiment of the present disclosure refers to a memory address corresponding to a memory block. For example, when memory is addressed in units of bytes, assuming that a memory block includes 16 bytes, the memory address corresponding to the memory block is the 16-byte address. During implementation, the logic layer may represent the allocated memory block by an array. Accordingly, the memory multiplexing queue is an array queue. Each array may be called an element of the queue.

In the embodiment of the present disclosure, the browser may detect whether the memory multiplexing queue is empty; and when the memory multiplexing queue is not empty, it is determined that the memory multiplexing queue includes a memory address, and step 2013 is performed; and when the memory multiplexing queue is empty, it is determined that the memory multiplexing queue does not include any memory address, and step 2016 is performed. The process that the browser detects whether the memory multiplexing queue is empty may be as follows: The browser acquires a first element from a queue header of the memory multiplexing queue; and when the first element is not empty, it is determined that the memory multiplexing queue is not empty; and when the first element is empty, it is determined that the memory multiplexing queue is empty.

In step 2013, when the memory multiplexing queue includes a memory address, the browser acquires a second memory address from the memory multiplexing queue according to the data volume of the video frame data.

After obtaining the video data by decoding, the browser may determine the data volume of the video frame data. For example, the browser may determine a frame length and a frame width of the video frame data, and an image format of the video frame data to determine the data volume of the video frame data. The interpretation of the frame length, the frame width, and the image format of the video frame data is the same as the corresponding explanation in step 202, and thus not described herein.

It should be noted that the frame length and the frame width of the video frame data may be carried in the video frame data. The image format may be a default image format of the server and the browser, and configured by the server to the browser in advance. Nevertheless, the image format may also be notified to the browser by being carried in the video frame data according to the actual needs, which is not limited in the embodiment of the present disclosure. After decoding the video stream to obtain the video frame data, the browser may acquire the frame length, the frame width, and the image format from the video frame data, thereby determining the data volume of the video frame data. For example, for video frame data in an image format of RGB24, the data volume of the video frame data is width×height×3 bit. For video frame data in an image format of YUV420, the data volume of the video frame data is width×height×1.5 bit. Width represents the frame length of the video frame data, and height represents the frame width of the video frame data.

When the memory multiplexing queue includes a memory address, the browser may compare a memory space indicated by the memory address with the video frame data according to the data volume of the video frame data, and acquire a second memory address from the memory multiplexing queue. A memory space indicated by the second memory address should be no less than the data volume of the video frame data.

The process that the browser acquires a second memory address from the memory multiplexing queue according to the data volume of the video frame data may be as follows: The browser acquires a memory address from the memory multiplexing queue according to the order of the memory addresses in the memory multiplexing queue, detects whether a memory space indicated by the memory address is not less than the data volume of the video frame data; and when the memory space is not less than the data volume of the video frame data, the browser determines the memory address as the second memory address; and when the memory space is less than the data volume of the video frame data, the browser acquires a next memory address from the memory multiplexing queue until the second memory address is acquired.

In another implementation, since the resolution of the video stream is relatively stable for a period of time, the memory space indicated by a plurality of memory addresses included in the memory multiplexing queue should be the same. When the size of a memory space indicated by a first memory address in the memory multiplexing queue is smaller than the data volume of the video frame data, then the memory space indicated by a plurality of memory addresses acquired subsequently is likely to be smaller than the data volume of the video frame data. Therefore, in order to improve the processing efficiency, when the memory space indicated by the first memory address acquired by the browser from the memory multiplexing queue is smaller than the data volume of the video frame data, the memory address is moved out of the memory multiplexing queue. The browser no longer acquires a next memory address from the memory multiplexing queue and directly perform the process of acquiring a third memory address from memory addresses other than the memory multiplexing queue, which may be referred to step 204 for details.

When the browser detects that a memory space indicated by the currently acquired memory address is smaller than the data volume of the video frame data, the browser reclaims the memory address, that is, removing the memory address from the memory multiplexing queue, clearing data stored in the memory space indicated by the memory address and releasing the memory address. Since the resolution of the video stream is stable within a specific period of time, the memory space indicated by the memory address being smaller than the data volume of the video frame data indicates that the memory address may not be used within a specific period of time. The unused memory addresses being recovered in a timely fashion may reduce memory usage and increase memory utilization.

In step 2014, when the second memory address is acquired from the memory multiplexing queue, the browser removes the second memory address from the memory multiplexing queue and takes the same as the first memory address allocated to the video frame data.

When acquiring the second memory address, the browser removes the second memory address from the memory multiplexing queue and takes the same as the first memory address allocated to the video frame data to store the video frame data. Removing a memory address from the memory multiplexing queue means deleting the memory address from the memory multiplexing queue.

It should be noted that after step 2014 is performed, step 2017 is directly performed.

In step 2015, when the second memory address is not acquired from the memory multiplexing queue, the browser acquires a third memory address from memory addresses other than the memory multiplexing queue and taken as the allocated first memory address.

The browser may also not be able to acquire the second memory address from the memory multiplexing queue. For example, the memory space indicated by the memory address in the memory multiplexing queue is not large enough. That is, there is no memory address whose memory space is not less than the data volume of the video frame data in the memory multiplexing queue. At this time, the browser may re-allocate a memory address to the video frame data. That is, the browser acquires a third memory address from unallocated memory addresses other than the memory multiplexing queue and takes the same as the first memory address allocated to the video frame data. For example, the browser may use a new ArrayBuffer( ) statement to create an array that satisfies the size of the video frame data. A memory address indicated by the array is the third memory address. Nevertheless, a memory space indicated by the third memory address is not less than the data volume of the video frame data.

It should be noted that after step 2015 is performed, step 2017 is directly performed.

In step 2016, when the memory multiplexing queue does not include any memory address, the browser acquires a fourth memory address is acquired from memory addresses other than the memory multiplexing queue and takes the same as the allocated first memory address.

When detecting that the memory multiplexing queue does not include any memory address, the browser re-allocates a memory address to the video frame data, that is, acquiring a fourth memory address from unallocated addresses other than the multiplexing queue. The process of allocating the fourth memory address is the same as the process of allocating the third memory address in step 2014, and thus details are not given herein.

In step 2017, the browser stores the video frame data in a memory space indicated by the first memory address.

Referring to FIG. 4, in the embodiment of the present disclosure, the process of decoding a video stream, the process of allocating memory after decoding, and the process of storing video frame data obtained by decoding may all be processed in a child thread. After storing the video frame data in the allocated memory space, the browser may render the video frame data in a main thread to display a video picture indicated by the video frame data.

The process that the browser renders the video frame data may be as follows: The browser maintains a rendering queue in the main thread, and after storing the video frame data, the browser sends the first memory address of the video frame data to the main thread by an address push message to add the first memory address to the render queue in the main thread. The address push message carries the first memory address.

During rendering, the browser periodically scans the rendering queue. As illustrated in FIG. 4, the browser requests video frame data (requestAnimationFrame) to the rendering queue, sequentially acquires the video frame data indicated by the memory address according to the order of the memory addresses in the rendering queue, and renders the acquired video frame data. Due to the difference between the decoding speed and the rendering speed of the video stream by the browser, the rendering queue may be empty when the browser reaches the scanning cycle of the rendering queue. At this time, the browser does not perform the rendering process, and continues to scan until the next scanning cycle. When the rendering queue is not empty, the browser performs rendering according to the video frame data indicated by the memory address in the rendering queue. For example, the browser may perform rendering using a preset drawing standard and display the rendered image with a canvas as a container. The preset drawing standard may be a WebGL (Web Graphics Library) drawing standard, which is not limited in the embodiment of the present disclosure.

In step 2018, after performing rendering based on the video frame data, the browser adds the first memory address to the memory multiplexing queue.

In order to avoid the rapid increase of memory usage caused by the continuous allocation of new memory, in the embodiment of the present disclosure, the memory space occupied by the video frame data that has been rendered is reused. That is, the memory address of the video frame data that has been rendered is reclaimed into the memory multiplexing queue, such that the memory address is subsequently allocated again to other unrendered video frame data.

The browser may add the first memory address to the memory multiplexing queue in two ways: in an implementation, the browser may pass the first memory address to a child thread of the multimedia browsing application by a main thread, and adds the first memory address to the memory multiplexing queue by the child thread; in another implementation, the browser directly adds the first memory address to the memory multiplexing queue by a main thread. During implementation, after rendering the video frame data in a main thread, the browser may send the first memory address to a child thread by calling a thread interaction interface (postMessage), and perform the step of adding the first memory address to the memory multiplexing queue by the child thread.

It should be noted that, since the decoding speed and the rendering speed of the video stream are relatively stable for a period of time, the number of occupied memory addresses of the browser may reach a stable state. That is, when the number of occupied memory addresses of the browser reaches a specific number, the storage requirement of the video frame data that has been decoded but not yet rendered may be satisfied. At this time, the number of memory addresses included in the memory multiplexing queue is also relatively stable. That is, when a memory address is removed from the memory multiplexing queue, a memory address is also added to the memory multiplexing queue. By the test of playing a high-definition monitoring video, during video playback, the playback requirements may be satisfied as long as the memory multiplexing queue includes five memory addresses. Because the browser only needs to open up a small number of memory addresses during video playback, a video may be played in a webpage by reusing the small number of memory addresses, thereby greatly reducing memory usage and improving memory utilization.

The principle of the memory multiplexing queue is the same as that of the memory multiplexing queue in step 207, and thus not described herein.

In the method according to the embodiment of the present disclosure, by adding a memory address of video frame data that has been rendered to a memory multiplexing queue, the browser may perform memory allocation according to the memory multiplexing queue, such that the allocated memory address may be reused. During video playback, there is no need to open up a memory space for each piece of video frame data, which reduces the memory occupation rate and improves the memory utilization rate.

The embodiment illustrated in FIG. 3 is that after a video stream is decoded, memory is allocated according to video frame data obtained by decoding. Further, the terminal may further perform memory pre-allocation after receiving the video stream. Since the size of the video frame data after decoding cannot be known before decoding the video stream, it is necessary to know the resolution of the video stream in advance, and perform memory pre-allocation according to the video frame data indicated by the resolution of the video stream to ensure proper memory allocation. The detailed process may be made reference to the embodiment illustrated in FIG. 7.

FIG. 7 is a flowchart of a memory management method according to an embodiment of the present disclosure. Referring to FIG. 7, the method flow according to the embodiment of the present disclosure includes the following steps.

In step 301, upon receiving a video stream, a resolution of the video stream is acquired.

In the embodiment of the present disclosure, the resolution of the video stream may be pre-configured by a server to a terminal, or may be actively acquired by the terminal from the server, which is not limited in the embodiment of the present disclosure. After receiving the video stream, the terminal may determine one frame of video data according to a frame identifier of a data packet included in the video stream, and pre-allocate memory to the frame of video data before decoding.

In step 302, whether the memory multiplexing queue includes a memory address is detected; and when the memory multiplexing queue includes a memory address, step 303 is performed; and otherwise, step 305 is performed.

This step is the same as the process of detecting whether the memory multiplexing queue includes a memory address in step 201, and thus details are not given herein.

In step 303, when the memory multiplexing queue includes a memory address, a second memory address is acquired from the memory multiplexing queue according to the data volume of the video frame data indicated by the resolution.

The terminal may calculate the data volume of the video frame data according to the resolution of the video stream. For example, the terminal determines a frame length and a frame width of the video frame data according to the resolution. For example, when the resolution is 1080×720, the corresponding video frame data has a frame length of 1080 and a frame width of 720. The data volume of the video frame data is determined according to the determined frame length and frame width of the video frame data and the image format of the video frame data. The process is the same as the method for determining the data volume of the video frame data in the above step 202, and thus details are not given herein.

In step 304, when the second memory address is acquired from the memory multiplexing queue, the second memory address is removed from the memory multiplexing queue and taken as a first memory address allocated to the video frame data.

This step is the same as the above step 203, and thus details are not given herein.

It should be noted that after step 304 is performed, step 307 is directly performed.

In step 305, when the second memory address is not acquired from the memory multiplexing queue, a third memory address is acquired from memory addresses other than the memory multiplexing queue and taken as the allocated first memory address.

This step is the same as step 204 above, and thus details are not given herein.

It should be noted that after step 305 is performed, step 307 is directly performed.

In step 306, when the memory multiplexing queue does not include any memory address, a fourth memory address is acquired from memory addresses other than the memory multiplexing queue according to the data volume of the video frame data indicated by the resolution and taken as the allocated first memory address.

This step is the same as the above step 205, and thus details are not given herein.

In step 307, the video frame data is stored in a memory space indicated by the first memory address.

Figure 8:
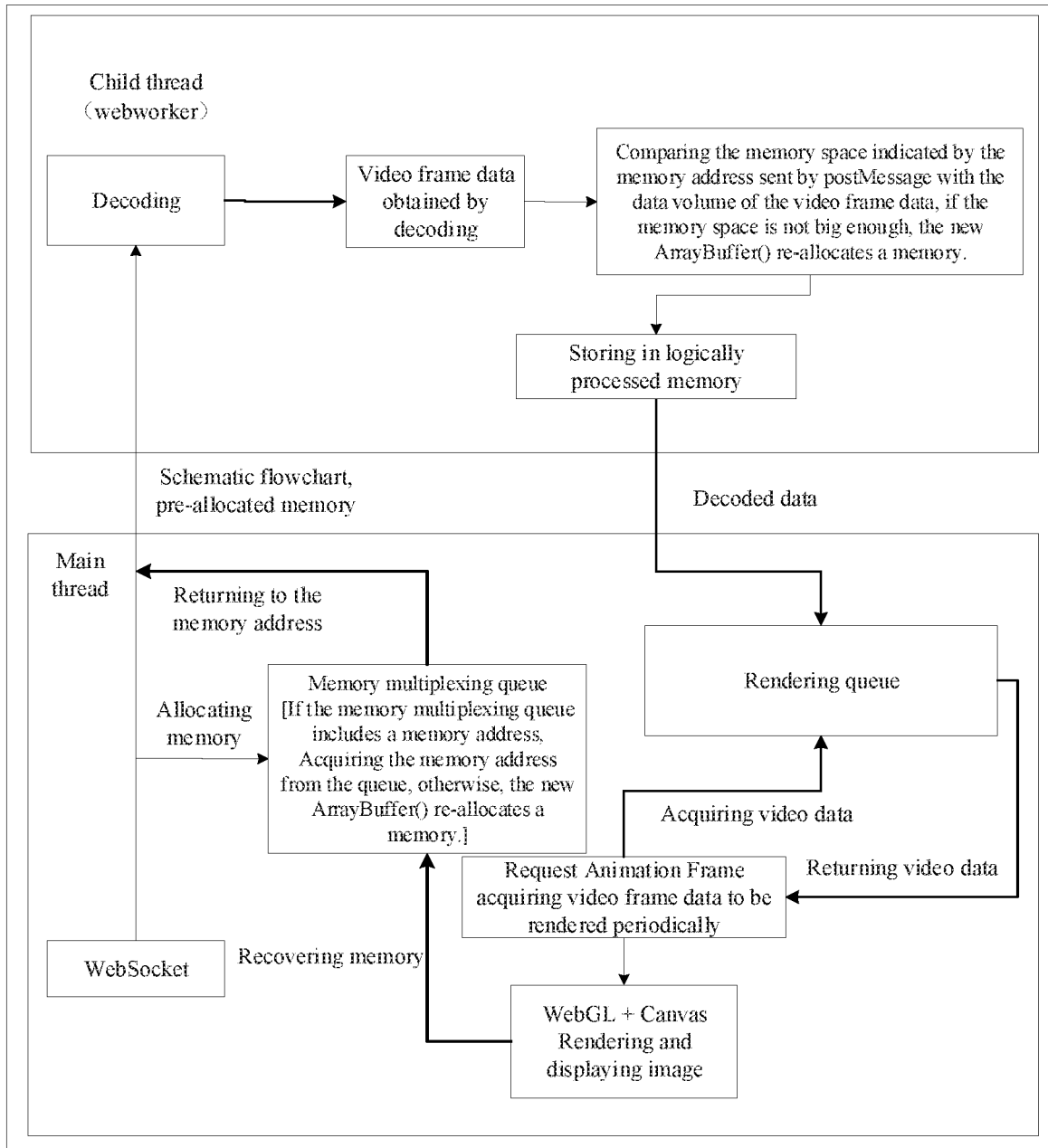
FIG. 8 is a schematic flowchart of memory management according to an embodiment of the present disclosure.

It should be noted that, referring to FIG. 8, a schematic flowchart of memory management is illustrated. Steps 301 to 306 are performed in a main thread of the terminal. After pre-allocating memory to video frame data, the terminal may pass the pre-allocated first memory address to a child thread by an address push message (postMessage), obtain the video frame data by decoding in the child thread, and store the video frame data in a memory space indicated by the first memory address.

In addition, in the embodiment of the present disclosure, the terminal also renders the video frame data obtained by decoding. The rendering process is the same as the process described in step 206, and thus details are not given herein.

In step 308, after rendering is performed based on the video frame data, the first memory address is added to the memory multiplexing queue.

This step is the same as the above step 207, and thus details are not given herein.

It should be noted that, since the resolution of the video stream may also change during video playback, for example, the resolution of the video stream is modified by a user by the terminal. When the resolution after modification is higher than the resolution before modification, the first memory address allocated by the terminal to the video frame data obtained by decoding may not be sufficient to store the video frame data. At this time, when the data volume of the video frame data obtained by decoding by the terminal is greater than the memory space indicated by the first memory address, the terminal re-allocates memory to the video frame data according to the actual data volume of the video frame data in a child thread. That is, a memory address is acquired from memory addresses other than the memory multiplexing queue and the first memory address and allocated to the video frame data. In addition, the terminal sends the actual resolution corresponding to the video frame data to a main thread by the child thread, modifies the resolution of the video stream in the main thread, and then performs memory allocation based on the modified resolution. While the actual resolution is sent to the main thread, the allocated memory address may also be sent to the main thread to add the allocated memory address to a rendering queue by the main thread.

In the method according to the embodiment of the present disclosure, by adding a memory address of video frame data that has been rendered to a memory multiplexing queue, memory allocation may be performed according to the memory multiplexing queue, such that the allocated memory address may be reused. During video playback, there is no need to open up a memory space for each piece of video frame data, which reduces the memory occupation rate and improves the memory utilization rate.

Figure 9:
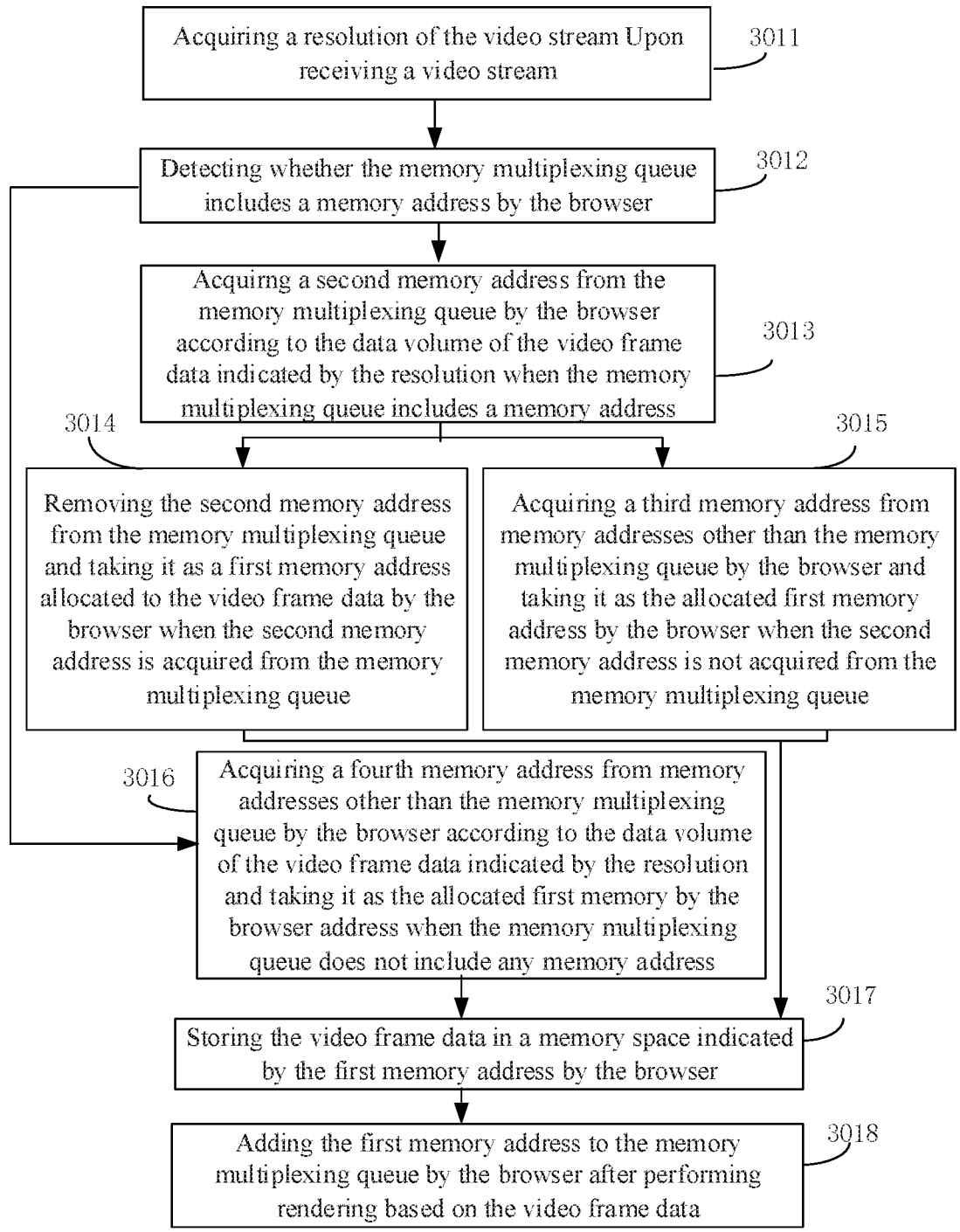
FIG. 9 is a flowchart of a memory management method according to an embodiment of the present disclosure.

Since the main body of the memory management in the embodiment of the present disclosure is a multimedia browsing application, in order to explain the flow of the memory management method more clearly, the multimedia browsing application being a browser is taken as an example to introduce the memory management method illustrated in FIG. 7. The detailed process may be made reference to FIG. 9.

In step 3011, after a video stream is received, a resolution of the video stream is acquired.

In the embodiment of the present disclosure, the resolution of the video stream may be pre-configured by a server to a browser, or may be actively acquired by the browser from the server, which is not limited in the embodiment of the present disclosure. After receiving the video stream, the browser may determine one frame of video data according to a frame identifier of a data packet included in the video stream, and pre-allocate memory to the frame of video data before decoding.

In step 3012, the browser detects whether the memory multiplexing queue includes a memory address; and when the memory multiplexing queue includes a memory address, step 303 is performed; and otherwise, step 305 is performed.

This step is the same as the process of detecting whether the memory multiplexing queue includes a memory address in step 201, and thus details are not given herein.

In step 3013, when the memory multiplexing queue includes a memory address, the browser acquires a second memory address from the memory multiplexing queue according to the data volume of the video frame data indicated by the resolution.

The browser may calculate the data volume of the video frame data according to the resolution of the video stream. For example, the browser determines a frame length and a frame width of the video frame data according to the resolution. For example, when the resolution is 1080×720, the corresponding video frame data has a frame length of 1080 and a frame width of 720. The data volume of the video frame data is determined according to the determined frame length and frame width of the video frame data and the image format of the video frame data. The process is the same as the method for determining the data volume of the video frame data in the above step 202, and thus details are not given herein.

In step 3014, when the second memory address is acquired from the memory multiplexing queue, the browser removes the second memory address from the memory multiplexing queue and takes the same as a first memory address allocated to the video frame data.

This step is the same as the above step 2014, and thus details are not given herein.

It should be noted that after step 3014 is performed, step 3017 is directly performed.

In step 3015, when the second memory address is not acquired from the memory multiplexing queue, the browser acquires a third memory address from memory addresses other than the memory multiplexing queue and takes the same as the allocated first memory address.

This step is the same as step 2015 above, and thus details are not given herein.

It should be noted that after step 3015 is performed, step 3017 is directly performed.

In step 3016, when the memory multiplexing queue does not include any memory address, the browser acquires a fourth memory address from memory addresses other than the memory multiplexing queue according to the data volume of the video frame data indicated by the resolution and takes the same as the allocated first memory address.

This step is the same as the above step 2016, and thus details are not given herein.

In step 3017, the browser stores the video frame data in a memory space indicated by the first memory address.

In the embodiment of the present disclosure, the browser also renders the video frame data obtained by decoding. The rendering process is the same as the process described in the above step 2017, and thus details are not given herein.

It should be noted that, referring to FIG. 8, a schematic flowchart of memory management is illustrated. Steps 301 to 306 are performed in a main thread of the browser. After memory is pre-allocated to video frame data, the browser may pass the pre-allocated first memory address to a child thread by an address push message (postMessage), obtain the video frame data by decoding in the child thread, and store the video frame data in a memory space indicated by the first memory address.

In step 3018, after performing rendering based on the video frame data, the browser adds the first memory address to the memory multiplexing queue.

This step is the same as the above step 207, and thus details are not given herein.

It should be noted that, since the resolution of the video stream may also change during video playback, for example, the resolution of the video stream is modified by a user by the browser. When the resolution after modification is higher than the resolution before modification, the first memory address allocated by the browser to the video frame data obtained by decoding may not be sufficient to store the video frame data. At this time, when the data volume of the video frame data obtained by decoding by the browser is greater than the memory space indicated by the first memory address, the browser re-allocates memory to the video frame data according to the actual data volume of the video frame data in a child thread. That is, a memory address is acquired from memory addresses other than the memory multiplexing queue and the first memory address and allocated to the video frame data. In addition, the browser sends the actual resolution corresponding to the video frame data to a main thread by the child thread, modifies the resolution of the video stream in the main thread, and then performs memory allocation based on the modified resolution. While the actual resolution is sent to the main thread, the allocated memory address may also be sent to the main thread to add the allocated memory address to a rendering queue by the main thread.

In the method according to the embodiment of the present disclosure, by adding a memory address of video frame data that has been rendered to a memory multiplexing queue, the browser may perform memory allocation according to the memory multiplexing queue, such that the allocated memory address may be reused. During video playback, there is no need to open up a memory space for each piece of video frame data, which reduces the memory occupation rate and improves the memory utilization rate.

Figure 10:
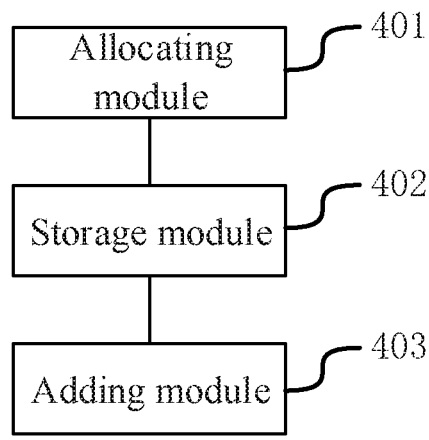
FIG. 10 is a block diagram of a memory management apparatus according to an embodiment of the present disclosure.

FIG. 10 is a block diagram of a memory management apparatus according to an embodiment of the present disclosure. Referring to FIG. 10, the apparatus includes an allocating module 401, a storage module 402, and an adding module 403.

The allocating module is configured to allocate a first memory address to video frame data based on a memory multiplexing queue, wherein the memory multiplexing queue records a memory address of video frame data that has been rendered; the storage module is configured to store the video frame data in a memory space indicated by the first memory address; and the adding module is configured to add the first memory address to the memory multiplexing queue after performing rendering based on the video frame data.

In a possible implementation, the allocating module includes:

a first acquiring unit, configured to acquire a second memory address from the memory multiplexing queue according to a data volume of the video frame data when the memory multiplexing queue includes a memory address, wherein a memory space indicated by the second memory address is not less than the data volume of the video frame data; and a first allocating unit, configured to remove the second memory address from the memory multiplexing queue when the second memory address is acquired from the memory multiplexing queue, and take the second memory address as the first memory address.

In a possible implementation, the allocating module further includes:

a second acquiring unit, configured to acquire a third memory address from memory addresses other than the memory multiplexing queue when the second memory address is not acquired from the memory multiplexing queue, wherein a memory space indicated by the third memory address is not less than the data volume of the video frame data; and a second allocating unit, configured to take the third memory address as the first memory address.

In a possible implementation, the allocating module further includes:

a third acquiring unit, configured to acquire a fourth memory address from memory addresses other than the memory multiplexing queue when the memory multiplexing queue does not include any memory address; and a third allocating unit, configured to take the fourth memory address as the first memory address.

In a possible implementation, the allocating module is configured to acquire a resolution of the video stream upon receiving a video stream; and according to a data volume of video frame data indicated by the resolution, perform the step of allocating a first memory address to video frame data based on a memory multiplexing queue; or the allocating module is configured to perform the step of allocating a first memory address to video frame data based on a memory multiplexing queue when the video frame data is acquired during a process of decoding the received video stream.

In a possible implementation, the apparatus further includes:

a launching module, configured to launch a child thread by a specified interface of a multimedia browsing application; and a decoding module, configured to decode the video frame data by the child thread.

In a possible implementation, the apparatus further includes:

a rendering module, configured to render the video frame data by a main thread of the multimedia browsing application;

wherein correspondingly, the adding module is configured to pass the first memory address to a child thread of the multimedia browsing application by the main thread, and add the first memory address to the memory multiplexing queue by the child thread, or add the first memory address to the memory multiplexing queue by the main thread.

In the apparatus according to the embodiment of the present disclosure, by adding a memory address of video frame data that has been rendered to a memory multiplexing queue, memory allocation may be performed according to the memory multiplexing queue, such that the allocated memory address may be reused. During video playback, there is no need to open up a memory space for each piece of video frame data, which reduces the memory occupation rate and improves the memory utilization rate.

It should be noted that, when the memory management apparatus according to the above embodiments manages the memory, the memory management apparatus is only illustrated by example of divided functional modules as mentioned above. In a possible implementation, the above functions may be assigned to different functional modules according to the needs. That is, the internal structure of the apparatus may be divided into different functional modules so as to attain all or part of the functions described above. In addition, the memory management apparatus and the memory management method according to the forging embodiments belong to the same concept. The specific implementation processes of the apparatus may refer to the embodiments of the memory management method, and are thus not described herein again.

Figure 11:
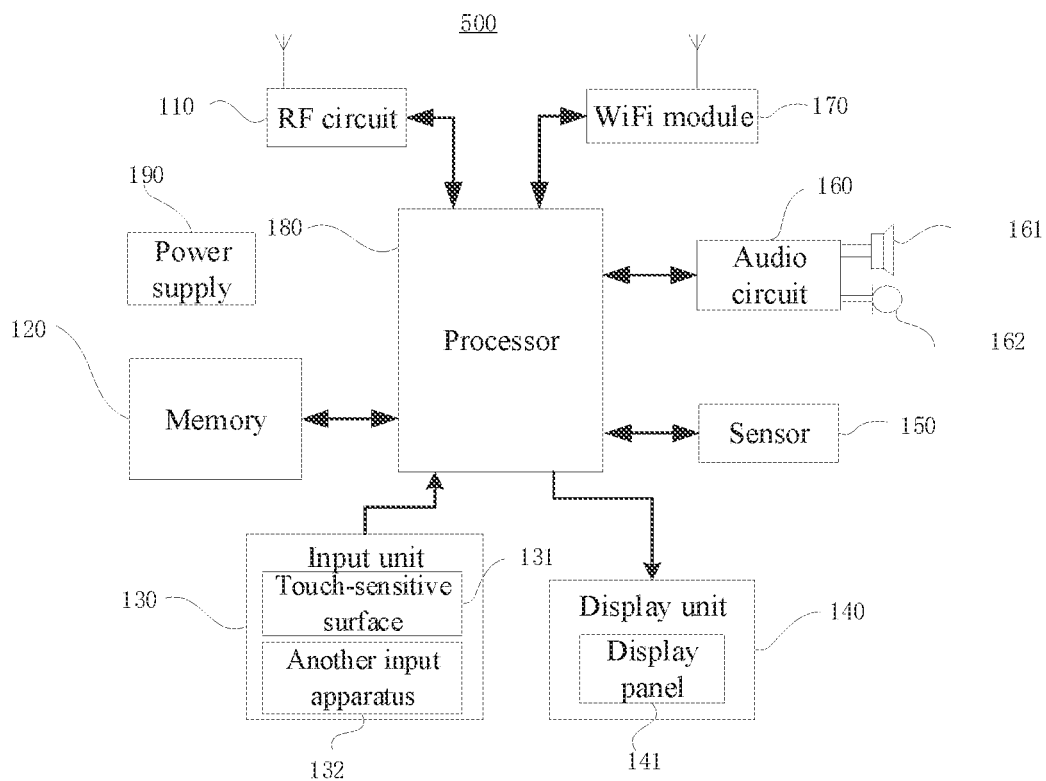
FIG. 11 is a schematic structural diagram of a terminal according to an embodiment of the present disclosure.

FIG. 11 shows a schematic structural diagram of a terminal involved in the embodiments of the present disclosure. The terminal may be configured to perform the memory management method according to the above embodiment.

The terminal 500 may include an radio frequency (RF) circuit 110, a memory 120 including one or more computer-readable storage media, an input unit 130, a display unit 140, a sensor 150, an audio circuit 160, a wireless fidelity (WiFi) module 170, a processor 180 including one or more processing cores, a power supply 190, and other components. It may be understood by those skilled in the art that the terminal structure illustrated in FIG. 11 does not constitute a limitation to the terminal. The terminal may include more or less components than those illustrated in FIG. 11, or a combination of some components, or the components arranged in a different fashion.

The RF circuit 110 may be configured to receive and send information in an information receiving and sending process or an on-the-phone process. Specifically, after downlink information of a base station is received, the downlink information is processed by one or more processors 180. In addition, uplink-related data is sent to the base station. Generally, the RF circuit 110 includes, but is not limited to, an antenna, at least one amplifier, a tuner, one or more oscillators, a subscriber identification module (SIM) card, a transceiver, a coupler, a low noise amplifier (LNA), a duplexer, and the like. In addition, the RF circuit 110 may be communicated with other apparatuses via wireless communication and a network. The wireless communication may use any communication standard or protocol, including but not limited to global system of mobile communication (GSM), general packet radio service (GPRS), code division multiple access (CDMA), wideband code division multiple access (WCDMA), long term evolution (LTE), an e-mail, short messaging service (SMS), and the like.

The memory 120 may be configured to store software programs and modules. The processor 180 executes various functional applications and data processing by running software programs and modules stored in the memory 120. The memory 120 may mainly include a program storage area and a data storage area. The program storage area may store an operating system, an application required by at least one function (such as a sound playing function and an image playing function), and the like. The data storage data area may store data (such as audio data and contacts) created in accordance with the use of the terminal 500. In addition, the memory 120 may include a high-speed random-access memory and may further include a non-volatile memory, such as at least one magnetic disk storage device, a flash memory device, or other volatile solid-state memory devices. Correspondingly, the memory 120 may further include a memory controller to provide access of the processor 180 and the input unit 130 for the memory 120.

The input unit 130 may be configured to receive input numeric or character information and to generate a keyboard signal input, a mouse signal input, an operating stick signal input, an optical signal input or a trackball signal input related to user settings and function controls. Specifically, the input unit 130 may include a touch-sensitive surface 131 as well as another input apparatus 132. The touch-sensitive surface 131, also referred to as a touch display or touchpad, may collect touch operations of a user (such as the user using a finger, a touch pen, or any suitable object or accessory to operate thereon or nearby) on or near the touch-sensitive surface 131, and may drive the corresponding connecting device according to a preset program. Optionally, the touch-sensitive surface 131 may include two portions, namely a touch detection device and a touch controller. The touch detection device detects a touch orientation of the user, detects a signal brought by the touch operation, and transmits the signal to the touch controller. The touch controller receives the touch information from the touch detection device, converts the touch information into a contact coordinate, and sends the contact coordinate to the processor 180. Further, the touch controller may receive a command sent from the processor 180 and execute the command. In addition, the touch-sensitive surface 131 may be implemented in various types such as a resistive type, a capacitive type, an infrared type, and a surface acoustic wave type. In addition to the touch-sensitive surface 131, the input unit 130 may further include another input apparatus 132. Specifically, the input apparatus 132 may include, but is not limited to, one or more of a physical keyboard, a function key (such as a volume control button, and an on/off button), a trackball, a mouse, an operating stick, and the like.

The display unit 140 may be configured to display information input by the user or information provided for the user, and various graphical user interfaces of the terminal 500. These graphical user interfaces may be composed of a graph, a text, an icon, a video, and any combination thereof. The display unit 140 may include a display panel 141. Optionally, the display panel 141 may be configured in the form of an LCD (Liquid Crystal Display), an OLED (Organic Light-Emitting Diode), or the like. Further, the touch-sensitive surface 131 may cover the display panel 141. When the touch-sensitive surface 131 detects a touch operation thereon or nearby, the touch operation is transmitted to the processor 180 to determine the type of a touch event. Then, the processor 180 provides a corresponding visual output on the display panel 141 according to the type of the touch event. Although in FIG. 14, the touch-sensitive surface 131 and the display panel 141 are implemented as two separate components to implement input and output functions, in some embodiments, the touch-sensitive surface 131 and the display panel 141 may be integrated to realize the input/output function.

The terminal 500 may further include at least one type of sensor 150, such as a light sensor, a motion sensor, and other sensors. Specifically, the light sensor may include an ambient light sensor and a proximity sensor. The ambient light sensor may adjust luminance of the display panel 141 according to luminance of the ambient light. The proximity sensor enables the display panel 141 and/or the backlight to be turned off when the terminal 500 moves to the ear. As a kind of motion sensor, the gravity acceleration sensor may detect accelerations in all directions (generally, in three axes), may detect gravity and the direction thereof when it is stationary, and may be applied to an application (such as a horizontal and vertical screen switching, a related game, and magnetometer attitude calibration) configured to identify a gesture of a mobile phone, a vibration recognition related function (such as a pedometer and tapping), and the like. Other sensors such as a gyroscope, a barometer, a hygrometer, a thermometer and an infrared sensor that may be installed in the terminal 500 are not repeated herein.

The audio circuit 160, a speaker 161 and a microphone 162 may provide an audio interface between the user and the terminal 500. In one aspect, the audio circuit 160 may transmit an electrical signal which is generated by converting the received audio data to the speaker 161; and the speaker 161 converts the electrical signal to a sound signal to be output. In another aspect, the microphone 162 converts the collected sound signal into an electrical signal; after being received by the audio circuit 160, the electrical signal is converted into audio data. After being output to and processed by the processor 180, the audio data is sent to, for example, another terminal by the RF circuit 110, or is output to the memory 120 for further processing. The audio circuit 160 may further include an earplug jack for providing communication of a peripheral earphone with the terminal 500.

WiFi is a short-range wireless transmission technology. With the WiFi module 170, the terminal 500 may assist users in sending and receiving e-mails, browsing webpages, and accessing streaming media, which provides wireless broadband Internet access for the users. Although FIG. 14 shows the WiFi module 170, it may be understood that the WiFi module 170 is not an essential configuration of the terminal 500, and may be omitted where necessary within the scope without changing the essence of the present disclosure.

The processor 180 is a control center of the terminal 500, and is connected to all portions of the mobile phone by using various interfaces and lines. By running or executing software programs and/or modules stored in the memory 120, and recalling data stored in the memory 120, the processor 180 executes various functions of the terminal 500 and processes data so as to comprehensively monitor the mobile phone. Optionally, the processor 180 may include one or more processing cores. Preferably, the processor 180 may integrate an application processor and a modem processor. The application processor mainly processes an operating system, a user interface, an application, and the like. The modem processor mainly processes wireless communications. It may be understood that the above modem processor may not be integrated into the processor 180.

The terminal 500 further includes a power supply 190 (such as a battery) for supplying power to the all components. Preferably, the power supply may be in logic connection to the processor 180 by a power supply management system to manage functions such as charging, discharging, and power management by the power supply management system. The power supply 190 may further include any of one or more DC or AC power sources, a recharging system, a power failure detection circuit, a power converter or inverter, a power status indicator, and the like.

Although not illustrated, the terminal 500 may further include a camera, a Bluetooth module, and the like, and details are not given herein. Specifically, in the embodiment, the display unit of the terminal 500 is a touch screen display. The terminal 500 further includes a memory, and one or more programs. The one or more programs are stored in the memory, are configured to be executed by the one or more processors, and include executable instructions. The terminal 500 is configured to execute the instructions to perform the following operations:

allocating a first memory address to video frame data based on a memory multiplexing queue, wherein the memory multiplexing queue records a memory address of video frame data that has been rendered;

storing the video frame data in a memory space indicated by the first memory address; and adding the first memory address to the memory multiplexing queue after performing rendering based on the video frame data.

In a possible implementation, the terminal 500 is configured to execute the instructions to perform the following operations:

acquiring a second memory address from the memory multiplexing queue according to a data volume of the video frame data when the memory multiplexing queue comprises a memory address, wherein a memory space indicated by the second memory address is not less than the data volume of the video frame data; and removing the second memory address from the memory multiplexing queue when the second memory address is acquired from the memory multiplexing queue, and taking the second memory address as the first memory address.

In a possible implementation, the terminal 500 is configured to execute the instructions to perform the following operations:

acquiring a third memory address from memory addresses other than the memory multiplexing queue when the second memory address is not acquired from the memory multiplexing queue, wherein a memory space indicated by the third memory address is not less than the data volume of the video frame data; and taking the third memory address as the first memory address.

In a possible implementation, the terminal 500 is configured to execute the instructions to perform the following operations:

acquiring a fourth memory address from memory addresses other than the memory multiplexing queue when the memory multiplexing queue does not comprise any memory address; and taking the fourth memory address as the first memory address.

In a possible implementation, the terminal 500 is configured to execute the computer program stored on the memory to perform the following operations:

acquiring a resolution of a video stream upon receiving the video stream, and performing the step of allocating a first memory address to video frame data based on a memory multiplexing queue according to a data volume of video frame data indicated by the resolution.

In a possible implementation, the terminal 500 is configured to execute the instructions to perform the following operation:

performing the step of allocating a first memory address to video frame data based on a memory multiplexing queue when the video frame data is acquired during a process of decoding the received video stream.

In a possible implementation, the terminal 500 is configured to execute the instructions to perform the following operations:

launching a child thread by a specified interface of a multimedia browsing application; and decoding the video frame data by the child thread.

In a possible implementation, the terminal 500 is configured to execute the instructions to perform the following operations:

rendering the video frame data by a main thread of a multimedia browsing application; and passing the first memory address to a child thread of the multimedia browsing application by the main thread, and adding the first memory address to the memory multiplexing queue by the child thread.

In a possible implementation, the terminal 500 is configured to execute the instructions to perform the following operations:

rendering the video frame data by a main thread of a multimedia browsing application;

adding the first memory address to the memory multiplexing queue by the main thread.

Figure 12:
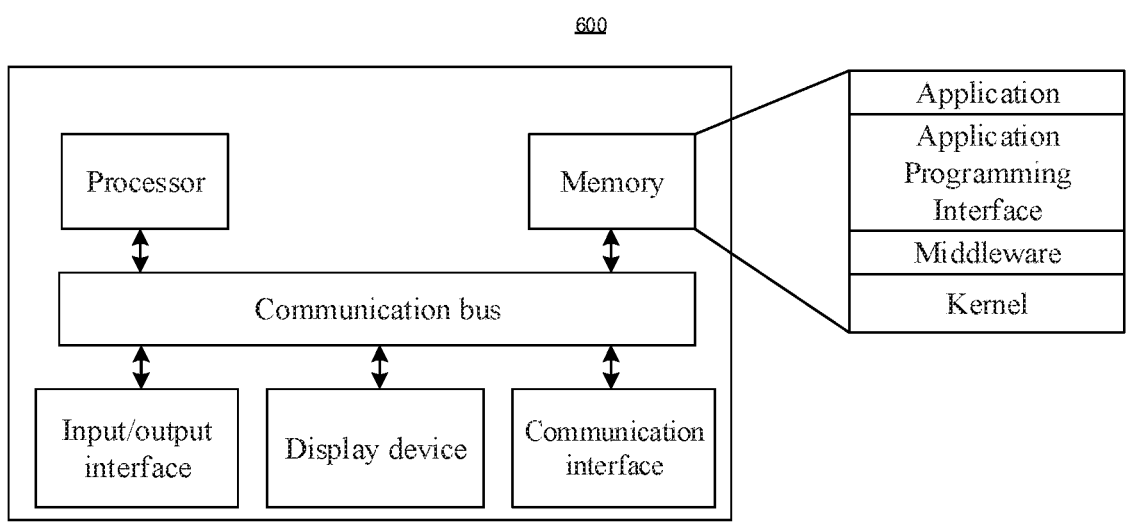
FIG. 12 is a schematic structural diagram of an electronic device 600 according to an embodiment of the present disclosure.

FIG. 12 is a schematic structural diagram of an electronic device 600 according to an embodiment of the present disclosure. Referring to FIG. 12, the electronic device 600 includes a processor and a memory, and may further include a communication interface, a communication bus, an input/output interface, and a display device. The processor, the memory, the input/output interface, the display device, and the communication interface communication with each other via the communication bus. The memory stores a computer program. The processor is configured to execute the computer program stored in the memory to perform the memory management method in the above embodiments.

The communication bus is a circuit that connects the elements described and implements transmission between these elements. For example, the processor receives commands from other elements over the communication bus, decrypts the received commands, and performs calculations or data processing in accordance with the decrypted commands. The memory may include program modules such as a kernel, middleware, an application programming interface (API), and an application. The program module may be composed of software, firmware or hardware, or at least two of them. The input/output interface forwards commands or data entered by the user by an input/output device (e.g., a sensor, a keyboard, a touch screen). The display device displays various information to the user. The communication interface connects the electronic device 600 with other network devices, user devices, and networks. For example, the communication interface may be connected to the network in a wired or wireless fashion to connect to other external network devices or user devices. The wireless communication may include at least one of the following: wireless fidelity (WiFi), Bluetooth (BT), near field communication (NFC), and global positioning system (GPS), cellular communication (for example, long term evolution (LTE), long term evolution-Advanced (LTE-A), code division multiple access (CDMA), wideband CDMA (WCDMA), universal mobile telecommunication system (UMTS), wireless broadband (WiBro) and global system for mobile communication (GSM). The wired communication may include at least one of the following: universal serialbus (USB), high definition multimedia interface (HDMI), and asynchronous standard interface (Recommended Standard 232, RS-232), and plain old telephone service (POTS). The network may be a telecommunication network and a communication network. The communication network may be a computer network, the Internet, an Internet of things, a telephone network. The electronic device 600 may be connected to the network by the communication interface. The protocol used by the electronic device 600 and other network device for communications may be supported by at least one of application, application programming interface (API), middleware, kernel, and communication interface.

In a possible implementation, the processor is configured to execute the computer program stored on the memory to perform the following operations:

allocating a first memory address to video frame data based on a memory multiplexing queue, wherein the memory multiplexing queue records a memory address of video frame data that has been rendered;

storing the video frame data in a memory space indicated by the first memory address; and adding the first memory address to the memory multiplexing queue after performing rendering based on the video frame data.

In a possible implementation, the processor is configured to execute the computer program stored on the memory to perform the following operations:

acquiring a second memory address from the memory multiplexing queue according to a data volume of the video frame data when the memory multiplexing queue comprises a memory address, wherein a memory space indicated by the second memory address is not less than the data volume of the video frame data; and removing the second memory address from the memory multiplexing queue when the second memory address is acquired from the memory multiplexing queue, and taking the second memory address as the first memory address.

In a possible implementation, the processor is configured to execute the computer program stored on the memory to perform the following operations:

acquiring a third memory address from memory addresses other than the memory multiplexing queue when the second memory address is not acquired from the memory multiplexing queue, wherein a memory space indicated by the third memory address is not less than the data volume of the video frame data; and taking the third memory address as the first memory address.

In a possible implementation, the processor is configured to execute the computer program stored on the memory to perform the following operations:

acquiring a fourth memory address from memory addresses other than the memory multiplexing queue when the memory multiplexing queue does not comprise any memory address; and taking the fourth memory address as the first memory address.

In a possible implementation, the processor is configured to execute the computer program stored on the memory to perform the following operations:

acquiring a resolution of a video stream upon receiving the video stream, and performing the step of allocating a first memory address to video frame data based on a memory multiplexing queue according to a data volume of video frame data indicated by the resolution.

In a possible implementation, the processor is configured to execute the computer program stored on the memory to perform the following operation:

performing the step of allocating a first memory address to video frame data based on a memory multiplexing queue when the video frame data is acquired during a process of decoding the received video stream.

In a possible implementation, the processor is configured to execute the computer program stored on the memory to perform the following operations:

launching a child thread by a specified interface of a multimedia browsing application; and decoding the video frame data by the child thread.

In a possible implementation, the processor is configured to execute the computer program stored on the memory to perform the following operations:

rendering the video frame data by a main thread of a multimedia browsing application; and passing the first memory address to a child thread of the multimedia browsing application by the main thread, and adding the first memory address to the memory multiplexing queue by the child thread.

In a possible implementation, the processor is configured to execute the computer program stored on the memory to perform the following operations:

rendering the video frame data by a main thread of a multimedia browsing application;

adding the first memory address to the memory multiplexing queue by the main thread.

In an exemplary embodiment, a computer readable storage medium, for example a memory storing computer programs, is provided. When the above computer programs are executed by a processor to complete the memory management method in the above embodiments. For example, the computer readable storage medium may be a read-only memory (ROM), a random-access memory (RAM), a CD-ROM, a magnetic tape, a floppy disk, an optical data storage device and the like.

Persons of ordinary skill in the art may understand that all or part of the steps described in the above embodiments may be completed by hardware, or by relevant hardware instructed by applications stored in a computer readable storage medium, such as a read-only memory, a disk or a CD.

Described above are only optional embodiments of the present disclosure, and are not intended to limit the present disclosure. Within the spirit and principles of the disclosure, any modifications, equivalent substitutions, or improvements are within the protection scope of the present disclosure.

What is claimed is:

1. A memory management method, comprising:
    allocating a first memory address to video frame data based on a memory multiplexing queue, wherein the memory multiplexing queue records a memory address of video frame data that has been rendered;
    storing the video frame data in a memory space indicated by the first memory address; and
    adding the first memory address to the memory multiplexing queue after performing rendering based on the video frame data,
    wherein the allocating a first memory address to video frame data based on a memory multiplexing queue comprises:
        acquiring a second memory address from the memory multiplexing queue according to a data volume of the video frame data when the memory multiplexing queue comprises a memory address, wherein a memory space indicated by the second memory address is not less than the data volume of the video frame data; and
        removing the second memory address from the memory multiplexing queue when the second memory address is acquired from the memory multiplexing queue, and taking the second memory address as the first memory address.

2. The method according to claim 1, wherein after the acquiring a second memory address from the memory multiplexing queue according to a data volume of the video frame data, the method further comprises:
    acquiring a third memory address from memory addresses other than the memory multiplexing queue when the second memory address is not acquired from the memory multiplexing queue, wherein a memory space indicated by the third memory address is not less than the data volume of the video frame data; and
    taking the third memory address as the first memory address.

3. The method according to claim 1, wherein the allocating a first memory address to video frame data based on a memory multiplexing queue comprises:
    acquiring a fourth memory address from memory addresses other than the memory multiplexing queue when the memory multiplexing queue does not comprise any memory address; and
    taking the fourth memory address as the first memory address.

4. The method according to claim 1, wherein the allocating a first memory address to video frame data based on a memory multiplexing queue comprises:
    acquiring a resolution of a video stream upon receiving the video stream, and allocating, according to a data volume of video frame data indicated by the resolution, allocating a first memory address to video frame data based on a memory multiplexing queue.

5. The method according to claim 1, further comprising:
launching a child thread by a specified interface of a multimedia browsing application; and
decoding the video frame data by the child thread.

6. The method according to claim 1, further comprising:
rendering the video frame data by a main thread of a multimedia browsing application;
wherein correspondingly, the adding the first memory address to the memory multiplexing queue after performing rendering based on the video frame data comprises:
passing the first memory address to a child thread of the multimedia browsing application by the main thread, and adding the first memory address to the memory multiplexing queue by the child thread.

7. The method according to claim 1, wherein the allocating a first memory address to video frame data based on a memory multiplexing queue comprises:
during a process of decoding the received video stream, allocating, when the video frame data is acquired, a first memory address to video frame data based on a memory multiplexing queue.

8. The method according to claim 1, further comprising:
rendering the video frame data by a main thread of a multimedia browsing application;
wherein correspondingly, the adding the first memory address to the memory multiplexing queue after performing rendering based on the video frame data comprises:
adding the first memory address to the memory multiplexing queue by the main thread.

9. An electronic device, comprising: a processor and a memory, wherein the memory is configured to store a computer program that when executed by the processor causes the processor to perform the following operations:
allocating a first memory address to video frame data based on a memory multiplexing queue, wherein the memory multiplexing queue records a memory address of video frame data that has been rendered;
storing the video frame data in a memory space indicated by the first memory address; and
adding the first memory address to the memory multiplexing queue after performing rendering based on the video frame data,
wherein the allocating a first memory address to video frame data based on a memory multiplexing queue comprises:
acquiring a second memory address from the memory multiplexing queue according to a data volume of the video frame data when the memory multiplexing queue comprises a memory address, wherein a memory space indicated by the second memory address is not less than the data volume of the video frame data; and
removing the second memory address from the memory multiplexing queue when the second memory address is acquired from the memory multiplexing queue, and taking the second memory address as the first memory address.

10. The electronic device according to claim 9, wherein the processor is configured to execute the computer program stored in the memory to perform the following operations:
acquiring a third memory address from memory addresses other than the memory multiplexing queue when the second memory address is not acquired from the memory multiplexing queue, wherein a memory space indicated by the third memory address is not less than the data volume of the video frame data; and
taking the third memory address as the first memory address.

11. The electronic device according to claim 9, wherein the processor is configured to execute the computer program stored in the memory to perform the following operations:
acquiring a fourth memory address from memory addresses other than the memory multiplexing queue when the memory multiplexing queue does not comprise any memory address; and
taking the fourth memory address as the first memory address.

12. The electronic device according to claim 9, wherein the processor is configured to execute the computer program stored in the memory to perform the following operations:
acquiring a resolution of a video stream upon receiving the video stream, and performing the step of allocating a first memory address to video frame data based on a memory multiplexing queue according to a data volume of video frame data indicated by the resolution.

13. The electronic device according to claim 9, wherein the processor is configured to execute the computer program stored in the memory to perform the following operations:
performing the step of allocating a first memory address to video frame data based on a memory multiplexing queue when the video frame data is acquired during a process of decoding the received video stream.

14. The electronic device according to claim 9, wherein the processor is configured to execute the computer program stored in the memory to perform the following operations:
launching a child thread by a specified interface of a multimedia browsing application; and
decoding the video frame data by the child thread.

15. The electronic device according to claim 9, wherein the processor is configured to execute the computer program stored in the memory to perform the following operations:
rendering the video frame data by a main thread of a multimedia browsing application; and
passing the first memory address to a child thread of the multimedia browsing application by the main thread, and adding the first memory address to the memory multiplexing queue by the child thread.

16. The electronic device according to claim 9, wherein the processor is configured to execute the computer program stored in the memory to perform the following operations:
rendering the video frame data by a main thread of a multimedia browsing application;
adding the first memory address to the memory multiplexing queue by the main thread.

17. A non-transitory computer-readable storage medium storing a computer program, the computer program, when executed by a processor, causes the processor to perform the following operations:
allocating a first memory address to video frame data based on a memory multiplexing queue, wherein the memory multiplexing queue records a memory address of video frame data that has been rendered;
storing the video frame data in a memory space indicated by the first memory address; and
adding the first memory address to the memory multiplexing queue after performing rendering based on the video frame data, wherein the allocating a first memory address to video frame data based on a memory multiplexing queue comprises:
- acquiring a second memory address from the memory multiplexing queue according to a data volume of the video frame data when the memory multiplexing queue comprises a memory address, wherein a memory space indicated by the second memory address is not less than the data volume of the video frame data; and
- removing the second memory address from the memory multiplexing queue when the second memory address is acquired from the memory multiplexing queue, and taking the second memory address as the first memory address.

* * * * *